United States Patent
Otoshi et al.

(10) Patent No.: US 7,840,711 B2
(45) Date of Patent: Nov. 23, 2010

(54) SYNCHRONOUS COMMUNICATION METHOD AND SYNCHRONOUS COMMUNICATION DEVICE

(75) Inventors: Hajime Otoshi, Tokyo (JP); Atsushi Ichinari, Tokyo (JP)

(73) Assignee: Mediaseek Inc., Minato-ku, Tokyo ( * ) Notice: Subject to any disclaimer, the term of this patent is extended or adjusted under 35 U.S.C. 154(b) by 629 days.

(21) Appl. No.: 11/736,485

(22) Filed: Apr. 17, 2007

(65) Prior Publication Data
US 2008/0126568 A1     May 29, 2008

Related U.S. Application Data

(63) Continuation of application No. PCT/JP2005/018936, filed on Oct. 14, 2005.

(30) Foreign Application Priority Data

Oct. 21, 2004   (JP)   ............................. 2004-306376
Nov. 8, 2004    (JP)   ............................. 2004-323762

(51) Int. Cl.
    *G06F 15/16*   (2006.01)
(52) U.S. Cl. .................... 709/248; 709/201; 709/205; 370/507; 370/241; 370/324; 463/40; 463/41; 463/42
(58) Field of Classification Search .................. 709/248, 709/201, 205; 370/507, 241, 324; 340/825, 340/870; 463/40–42
    See application file for complete search history.

(56) References Cited

U.S. PATENT DOCUMENTS 5,313,462 A     5/1994  Fujino et al. ................ 370/103
5,751,220 A  *  5/1998  Ghaffari ................. 340/825.21
5,987,376 A  * 11/1999  Olson et al. .................. 701/201
2002/0010917 A1 *  1/2002  Srikantan et al. ............... 725/1
2003/0046433 A1 *  3/2003  Luzzatti et al. ............. 709/248
2006/0154710 A1 *  7/2006  Serafat .......................... 463/1

FOREIGN PATENT DOCUMENTS

JP      02-041190    2/1990
JP      05-206975    8/1993
JP      11-509394    8/1999

* cited by examiner

*Primary Examiner*—Wing F Chan
*Assistant Examiner*—Benjamin M Thieu
(74) *Attorney, Agent, or Firm*—Hogan Lovells US LLP

(57) ABSTRACT

A synchronous communication device for processing communication synchronously among a plurality of information terminals connected to a communication line, comprising: judging means for judging whether or not the plurality of information terminals connected to the communication line are in a normal communication state; input information setting means for, when on the basis of the result from the judging means judgment is made that an anomaly has occurred in at least one information terminal among the plurality of terminals and that synchronization of the one information terminal with another information terminal among the plurality of terminals is not possible, setting as assumed input information the input information of the synchronization immediately prior to the synchronization in which synchronization is not possible; and computing means for, on the basis of the assumed input information set by the input information setting means, determining the synchronization state of the synchronization in which synchronization is not possible, by executing a predetermined computing process; wherein each process is repeated until the judging means judges that synchronization with the other information terminal among the plurality of information terminals becomes possible through recovery of the communication state of the information terminal in which the anomaly has occurred.

10 Claims, 21 Drawing Sheets

US 7,840,711 B2

SYNCHRONOUS COMMUNICATION METHOD AND SYNCHRONOUS COMMUNICATION DEVICE

CROSS-REFERENCE TO THE RELATED APPLICATIONS

This application is a continuation of international application No. PCT/JP2005/018936 filed Oct. 14, 2005, the entire contents of which are incorporated by reference. This application also claims benefit of priority under 35U.S.C. §119 to Japanese Patent Application No. 2004-306376 filed Oct. 21, 2004 and Japanese Patent Application No. 2004-323762 filed Nov. 8, 2004, the entire contents of both of which are incorporated by reference.

TECHNICAL FIELD

The present invention relates to a synchronous communication device and a synchronous communication method for processing communication synchronously among a plurality of information processing terminals connected to a communication line.

BACKGROUND ART

Conventional synchronous communication devices include, for instance, the family communication system described in Japanese Unexamined Patent Application Laid-open No. H02-041190. This family communication system is a system for carrying out communication between at least two family computers connected via a communication line, the system comprising means for correcting the time lag of data inputted through an input unit of each family computer, wherein repeatedly generated number codes in synchrony with a key scan pulse are transmitted to a partner side device, the time lag being corrected at the partner side using the number code.

FIG. 16 is a timing chart explaining the timing of data in the above-described family computer communication system. The operation of this family computer communication system will be explained with reference to FIG. 1.

In FIG. 16, (a) and (b) denote respectively a key scan pulse generated by each family computer. The state of the keyboard is acquired, by the family computer, in the form of data through these key scan pulses (a) and (b). When a communication adapter is used, as illustrated in (c) and (d), a delay corresponding to the time between the instants t1 to t2 and t3 to t4 occurs during data transmission to the modem of the partner side. When two family computers are gaming simultaneously, it becomes necessary to send to the family computers the data pair denoted in the figure by m and n, in a correct sequence. That is, the data of the player captured at the time of the pulse m, and the data of the partner captured at the time of the pulse n must be inputted to the respective family computer in the right sequence.

As a result of communication delay, data is inputted in FIG. 16 from the first to the second family computer at the time of the pulse n+3, while at the time of the pulse m+3, data is inputted from the second to the first family computer. When for instance transmission of data captured at timings m and n is delayed up to timings m+3 and n+3, the data sent to both family computers becomes a data pair delayed by 3 pulses each.

The two family computers are not limited to have their power turned on simultaneously, and hence the time difference between m and n changes by 1 pulse at the highest. Thus, upon reaching N pulses, the data at the time m is sent to the partner side at the time N+2, as illustrated in FIG. 1. However, data at the time N cannot arrive until the time m+4. When data is sent in this condition to the family computers, the required data is not received at the required time, and the two family computers end up operating separately. As the above makes clear, the delay occurring between family computers is the sum of the data communication delay and the key scan pulse delay.

The data communication delay depends on the hardware and on the communication speed, and hence is relatively fixed. The key scan pulse delay, however, varies in accordance with the timing with which the device is operated, and varies gradually as a result of the phase difference of the key scan pulses in the two devices. To correct this, number codes repeatedly generated in synchrony with the key scan pulses are sent to the partner side. The side receiving the number codes synchronizes own data to the content of the number code and transmits it.

To detect the delay, and to synchronize and send the data, the partner number code and the own number code are stored, and a timer is operated. The timer is stopped next with an own scan pulse, whereupon there is measured the delay from the input time of the partner data to the generation time of the own scan pulse. An average value is determined by repeating this operation several times. Delay is correctly detected by comparing this average value with a numerical value set beforehand.

A variable shift register is necessary for delaying own captured data by several pulses. For instance, if the data of the m pulse is sent to a family computer at m+3, a three-stage shift register is needed. The delay pulse count must be variable in order to track the changing key scan pulses.

In the above family computer communication system, briefly, information inputted at the N-th synchronization is used for information processing at the (N+m)th (m is an integer>0) synchronization, to prevent thereby loss of processing speed on account of communication delay.

In the above-described family computer system, however, waiting until information reception becomes necessary when no input information from the partner can be received within a predetermined time. As a result, synchronization processing becomes temporarily paused, which is annoying for the users that use the family computer system. When using a communication line in which communication quality is not assured, such as internet or the like, in particular, this is problematic in that temporary stops may occur every few seconds, dramatically detracting thereby from the value of the system.

DISCLOSURE OF THE INVENTION

In the light of the above problems of conventional family computer systems, an object of the present invention is to provide a synchronous communication method and an synchronous communication device that allow synchronization processing to proceed without temporary synchronization processing pausing, even when input information from a partner could not be received within a predetermined time.

The above object of the invention is achieved by way of a synchronous communication device for processing communication synchronously among a plurality of information terminals connected to a communication line, comprising: judging means for judging whether or not the plurality of information terminals connected to the communication line are in a normal communication state; input information setting means for, when on the basis of a result from the judging means judgment is made that an anomaly has occurred in at least one information terminal among the plurality of terminals and that synchronization of the one information terminal with another information terminal among the plurality of terminals is not possible, setting as assumed input information the input information of the synchronization immediately prior to the synchronization in which synchronization is not possible; and computing means for, on the basis of the assumed input information set by the input information setting means, determining the synchronization state of the synchronization in which synchronization is not possible, by executing a predetermined computing process; wherein each process is repeated until the judging means judges that synchronization with the other information terminal among the plurality of information terminals becomes possible through recovery of the communication state of the information terminal in which the anomaly occurred.

The above object of the invention is achieved by way of a synchronous communication method for processing communication synchronously among a plurality of information terminals connected to a communication line, comprising: a step of judging whether or not the plurality of information terminals connected to the communication line are in a normal communication state; a step of setting, when on the basis of a result from the judging judgment is made that an anomaly has occurred in at least one information terminal among the plurality of terminals and that synchronization of the one information terminal with another information terminal among the plurality of terminals is not possible, as assumed input information the input information of the synchronization immediately prior to the synchronization in which synchronization is not possible; a step of determining, on the basis of the set assumed input information, the synchronization state of the synchronization in which synchronization is not possible, by executing a predetermined computing process; and step of repeating each step until the synchronization with the other information terminal among the plurality of information terminals becomes possible through recovery of the communication state of the information terminal in which the anomaly has occurred.

The synchronous communication device of the present invention, having the above-described constitution, has the effect of allowing execution of synchronization processing even when input information from a partner cannot be received within a predetermined time, and hence allows synchronization processing to proceed without temporary pausing.

Similarly, the synchronous communication method of the present invention, having the above-described steps, has the effect of allowing execution of synchronization processing even when input information from a partner cannot be received within a predetermined time, and hence allows synchronization processing to proceed without temporary pausing.

BEST MODE FOR CARRYING OUT THE INVENTION

Figure 1:
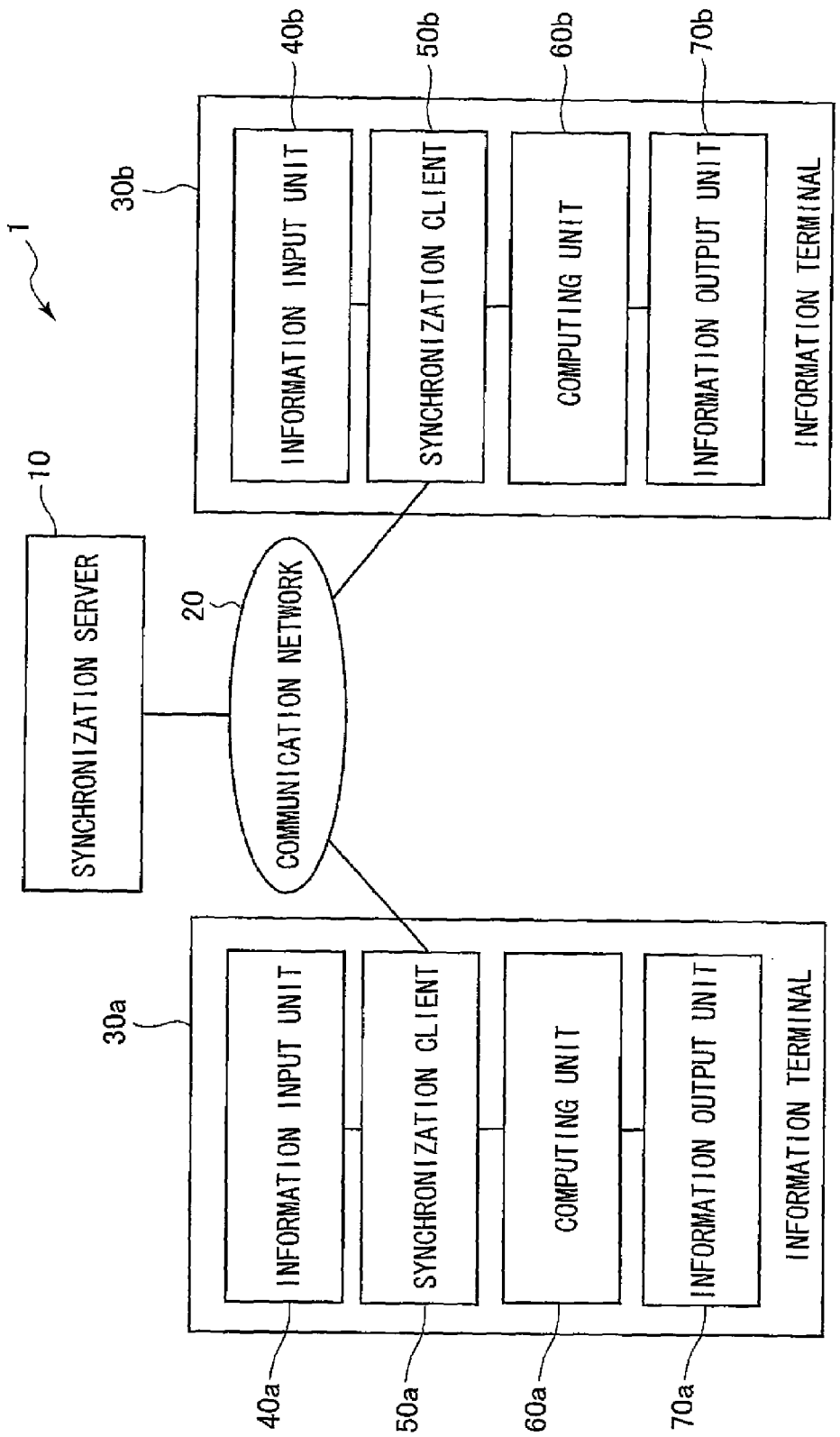
FIG. 1 is a schematic block diagram illustrating the constitution of a synchronous communication game system in which plural users participate simultaneously, being an embodiment of the synchronous communication device according to the present invention.

In the synchronous communication device of the present invention, the computing means may execute, as the predetermined computing process, a computing process for obtaining a synchronization state of a game in the synchronization in which synchronization is not possible.

In the synchronous communication device of the present invention, the computing means may return the information terminal to a backed-up synchronization state.

In the synchronous communication device of the present invention, when the judging means judges that it is not possible to equalize the synchronization state of all the information terminals to a same synchronization state even through continued setting of the input information as assumed input information, the computing means may return the information terminal to a backed-up synchronization state.

In the synchronous communication device of the present invention, the computing means may store actual input information while the assumed input information is being used, and upon recommencement of ordinary synchronization processing, may use as input information the stored information with arbitrary skipping thereof.

In the synchronous communication device of the present invention, the computing process may be a combination of one or more among calculation of the position of a game character, collision detection, and score calculation.

In the synchronous communication device of the present invention, the input information setting means may set, as the assumed input information, the input information of an arbitrary synchronization previous to the synchronization in which synchronization is not possible, instead of input information of the synchronization in which synchronization is not possible.

In the computing step of the synchronous communication method of the present invention, there may be executed, as the predetermined computing process, a computing process for obtaining a synchronization state of a game in the synchronization in which synchronization is not possible.

In the computing step of the synchronous communication method of the present invention, the information terminal may be returned to a backed-up synchronization state.

When in the judgment step of the synchronous communication method of the present invention it is judged that it is not possible to equalize the synchronization state of all the information terminals to a same synchronization state even through continued setting of the input information as assumed input information, the information terminal may be returned, in the computing step, to a backed-up synchronization state.

In the computing step of the synchronous communication method of the present invention, actual input information may be stored while the assumed input information is being used, and upon recommencement of ordinary synchronization processing, the stored information may be used, with arbitrary skipping thereof, as input information.

In the synchronous communication method of the present invention, the computing process may be a combination of one or more among calculation of the position of a game character, collision detection, and score calculation.

In the input information setting step of the synchronous communication method of the present invention, there may be set, as the assumed input information, the input information of an arbitrary synchronization previous to the synchronization in which synchronization is not possible, instead of input information of the synchronization in which synchronization is not possible.

Example 1

Preferred embodiments of the synchronous communication device and the synchronous communication method according to the present invention are explained next with reference to accompanying drawings.

FIG. 1 is a schematic block diagram illustrating the constitution of a synchronous communication game system in which plural users participate simultaneously, being an embodiment of the synchronous communication device according to the present invention.

The synchronous communication game system 1 illustrated in FIG. 1 comprises a synchronization server 10 being a judging means, as a server for performing synchronous communication processing, a communication network 20, being a communication line connected to the synchronization server 10 and information terminal 30, for performing data communication between the synchronization server 10 and the information terminal 30, and information terminal 30 configured to input and output predetermined data, comprising two information terminals 30a and 30b arranged at the game participant sides.

Although in the present embodiment the information terminal 30 comprises two information terminals 30a and 30b, the present invention is not limited thereto, and the information terminal 30 may comprise also three or more information terminals 30a to 30N (wherein N=c to z). For simplicity, herein will be explained an instance with two information terminals 30a and 30b.

In the synchronous communication game system 1 of FIG. 1, the game participants can exchange mutual information thanks to the respective information terminals 30a and 30b being connected to the synchronization server 10 via the communication network 20.

The information terminals 30a and 30b comprise external information input units 40a and 40b that constitute one part of an input information setting means, synchronization clients 50a and 50b constituting one part of the input information setting means and playing the role of clients for performing synchronous communication processing, computing units 60a and 60b being computing means, and information output units 70a and 70b.

Hereinafter, the synchronization clients 50a and 50b, when referred to collectively, will be represented as synchronization client 50, and likewise, the computing units 60a and 60b, when referred to collectively, will be represented as computing unit 60.

Steps relating to the synchronization client 50a and the computing unit 50a are denoted SXXXXa (wherein XXXX is an arbitrary numerical value), while steps relating to the synchronization client 50b and the computing unit 50b are denoted SXXXXb (wherein XXXX is an arbitrary numerical value). When referred to collectively without differentiating between them, the suffix a and/or b will be omitted and the steps will be represented as SXXXX (wherein XXXX is an arbitrary numerical value).

Figure 2:
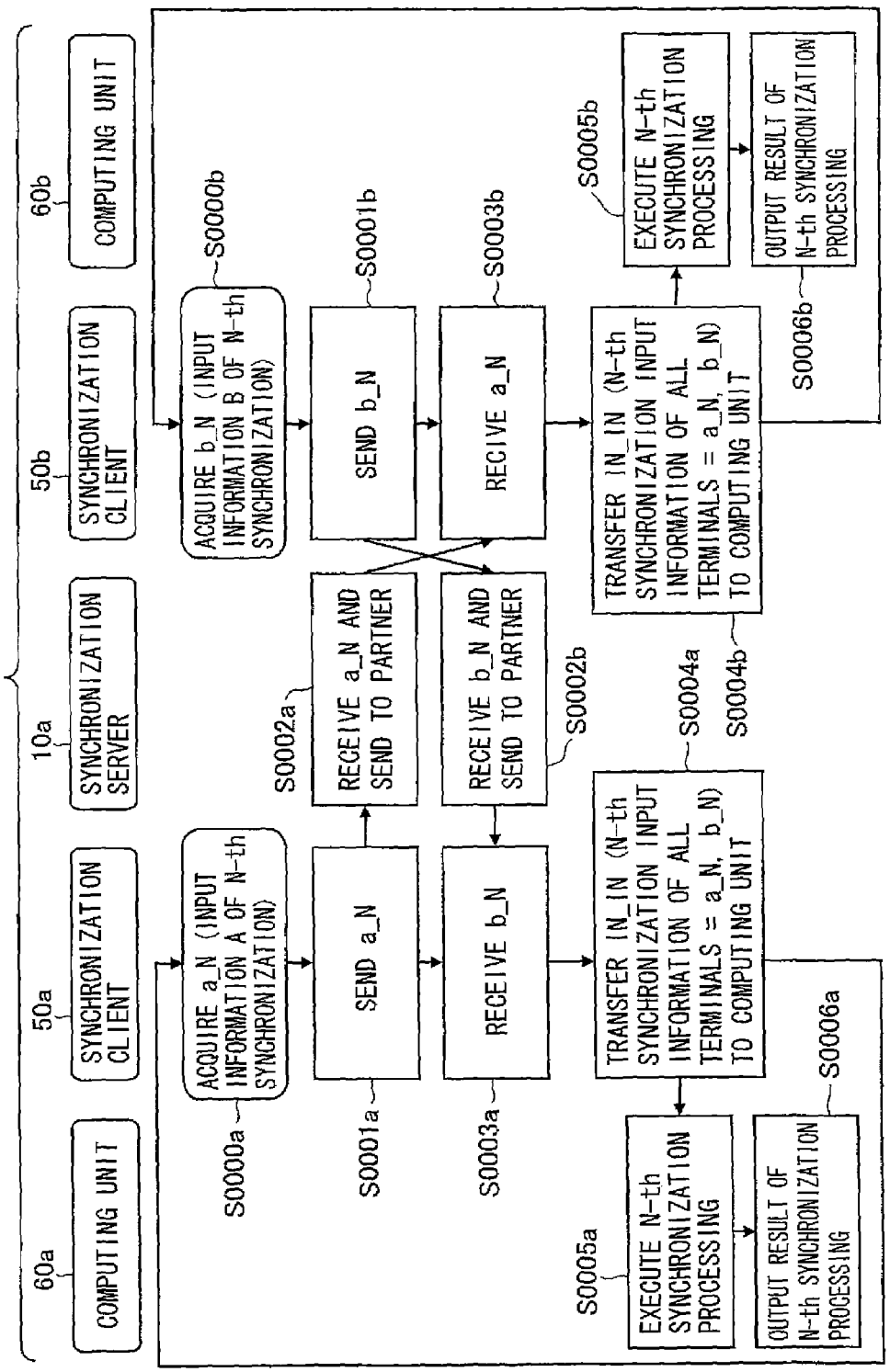
FIG. 2 is a workflow diagram explaining the operation of the synchronous communication game system illustrated in FIG. 1.

The operation of the synchronous communication game system 1 illustrated in FIG. 1 during an actual game will be explained next with reference to FIG. 2. Execution of synchronous processing the N-th time from now will be assumed herein.

Firstly, the synchronization client 50a of the information terminal 30a acquires input information a_N inputted by a game participant through the external information input unit 40a (step S0000a).

The synchronization client 50a sends the input information a_N to the synchronization server 10 (step S0001a). Having received the input information a_N, the synchronization server 10 sends the entire input information a_N to the synchronization clients 50 of the opponents, in the present example, only to the synchronization client 50b (step S0002a).

At the same time, the synchronization client 50b of the information terminal 30b acquires input information b_N inputted by a game participant through the external information input unit 50b (step S0000b), and sends the input information b_N to the synchronization server 10 (step S0001*b*). The synchronization server 10 sends the received input information b_N to the synchronization client 50*a* (step S0002*b*).

The synchronization client 50*a*, receiving the input information b_N sent by the synchronization server 10 (step S0003*a*), can put together the N-th synchronization input information, i.e. the input information a_N and input information b_N (hereinafter denoted as input information INa_N).

Similarly, the synchronization client 50*b*, receiving the input information a_N (step S0003*b*), can put together the N-th synchronization input information, i.e. the input information a_N and input information b_N (hereinafter denoted as input information INb_N). Herein, input information INa_N=input information INb_N. Such cases where the N-th synchronization input information is identical for both synchronization clients 50*a* and 50*b* will be denoted hereinafter as input information IN_N.

Thus, the entire input information IN_N of the information terminals 30*a* and 30*b* required for performing N-th time synchronization processing can be shared by the respective synchronization clients 50*a* and 50*b*.

Next, the synchronization client 50*a* transfers the input information IN_N to the computing unit 60*a* (step S0004*a*). The computing unit 60*a* executes computation on the basis of the input information IN_N and on the basis of the game synchronization state Sa_N−1 immediately preceding in the information terminal 30*a*, and calculates the game synchronization state Sa_N of the N-th synchronization (step S0005*a*). The synchronization state Sa_N is displayed by the information output unit 70*a*.

In the synchronization client 50*b* computation is similarly carried out also on the basis of the input information IN_N and on the basis of the game synchronization state Sb_N−1 immediately preceding in the information terminal 30*b*, and the game synchronization state Sb_N of the N-th synchronization is calculated. The synchronization state Sb_N is displayed by the information output unit 70*b*.

If herein the synchronization state Sa_N−1=the synchronization state Sb_N−1, then the input information INa_N=the input information INb_N, and hence the synchronization state Sa_N=the synchronization state Sb_N (cases where the synchronization state of the N-th synchronization are thus identical are denoted hereinafter as synchronization state S_N).

Since the information terminals 30*a* and 30*b* share thus the same input information, they can share also the same synchronization state.

In the synchronization clients 50*a* and 50*b*, the synchronization count N advances to N+1 and the next synchronization processes (steps S0000*a*~, steps S0000*b*~) are repeated in the same manner. As long as they share the same input information, the two synchronization clients 50*a* and 50*b* share as well the same synchronization state.

Figure 3:
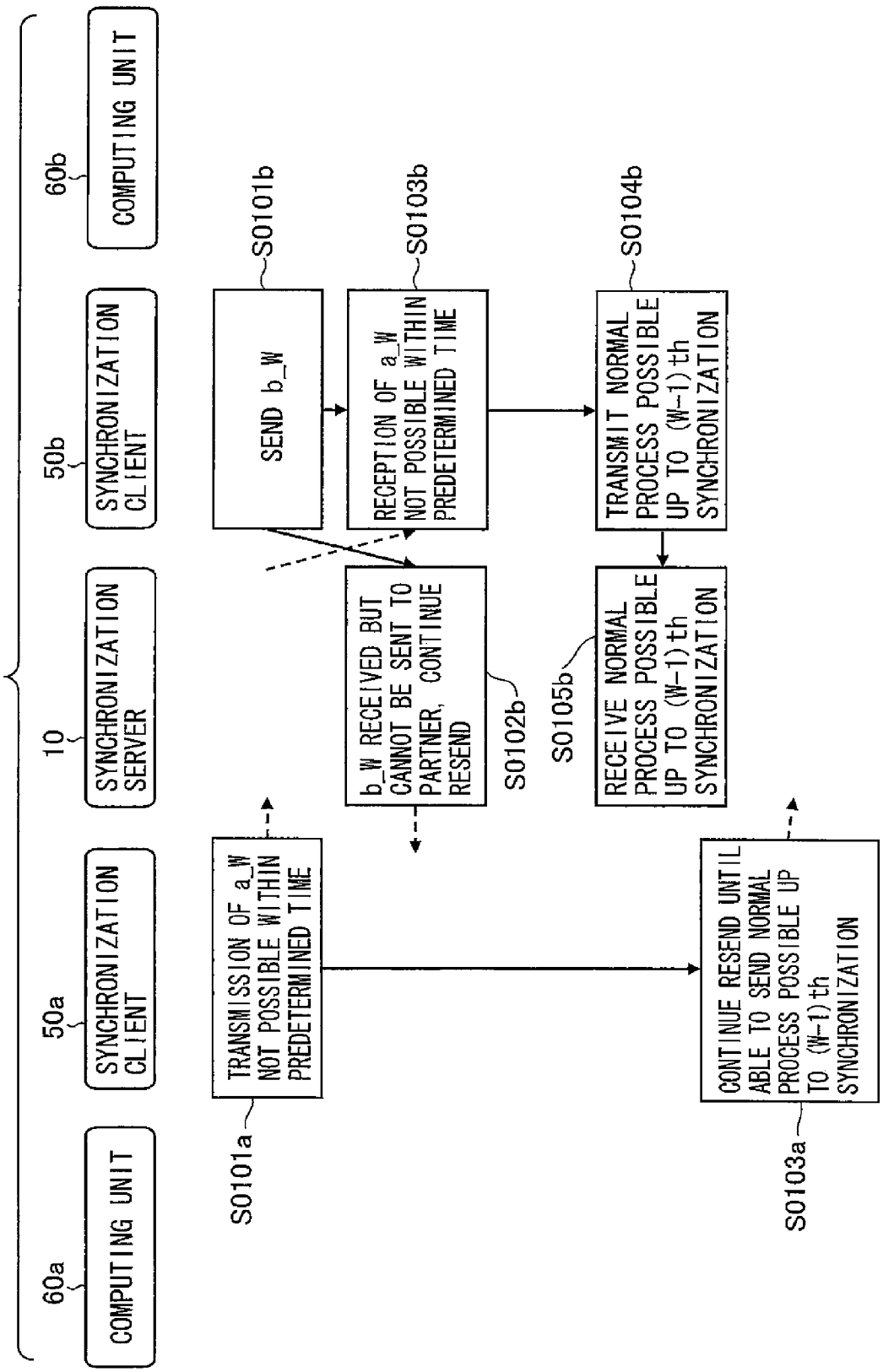
FIG. 3 is a workflow diagram explaining the operation of the synchronous communication game system illustrated in FIG. 1.

With reference to FIG. 3, an operation instance is explained next wherein the communication state between the synchronization client 50*a* and the synchronization server 10 deteriorates temporarily during the game.

A scenario will be assumed herein where communication between the synchronization client 50*a* and the synchronization server 10 deteriorates temporarily such that the synchronization client 50*a* cannot send input information a_N to the synchronization server 10 within a predetermined time (step S0101*a*).

In cases where conventional technology was used, information from the partner, obviously, could not be received, and synchronization processing was temporarily paused until recovery of the communication state and reception of information from the partner. The resulting sudden stops in screen motion during the game were annoying to the user, and constituted a factor that dramatically lowered product value. In the explanation of the present example will be illustrated next a process in which no such temporary pausing occurs.

The processes from this point on are processes that prevent the above-described temporary pausing; it should be noted, however, that the synchronization client 50*a* repeatedly performs resending until transmission of the input information a_N to the synchronization server 10 is successful. The synchronization count N herein will be referred to hereinafter as W to differentiate it from the synchronization count N normally employed.

Since the input information a_W cannot be sent within a predetermined time, the synchronization client 50*a* judges that the communication state has deteriorated. Accordingly, processing is carried out thenceforward so as to prevent temporary pausing of synchronization processing on account of communication state deterioration. Specifically, firstly, the synchronization server 10 is transmitted data to the effect that, until the (W−1)th synchronization, processing was being carried out normally (step S0107*a*). Since the communication state is actually defective, retransmission continues until transmission becomes possible (step S0107*a*), while, as described above, the following processes are carried out in parallel. Unless otherwise stated, when information cannot be transmitted/received and retransmission (or reception waiting) is carried out on account of a deficient communication state, the subsequent processes are carried out in parallel with such retransmission and the like.

Meanwhile, the synchronization client 50*b* sends the input information b_W to the synchronization server 10 (step S0101*b*). The synchronization server 10 sends the received input information b_W to the synchronization client 50*a*. Since the communication state is actually deficient, retransmission continues until transmission becomes possible (step S0102*b*). Since the communication state on the information terminal 30*a* is deficient, the synchronization client 50*b* cannot receive the input information a_W within a predetermined time (step S0103*b*). The synchronization client 50*b* judges that the communication state is deteriorated, and as described above, enters a process for avoiding temporary pausing while maintaining the reception wait state. The synchronization client 50*b* transmits to the synchronization server 10 that, until the (W−1)th synchronization, processing could be carried out normally (step S0104*b*).

The synchronization server 10 receives data to the effect that until the (W−1)th synchronization the synchronization client 50*b* could carry out processing normally (step S0105*b*).

Figure 4:
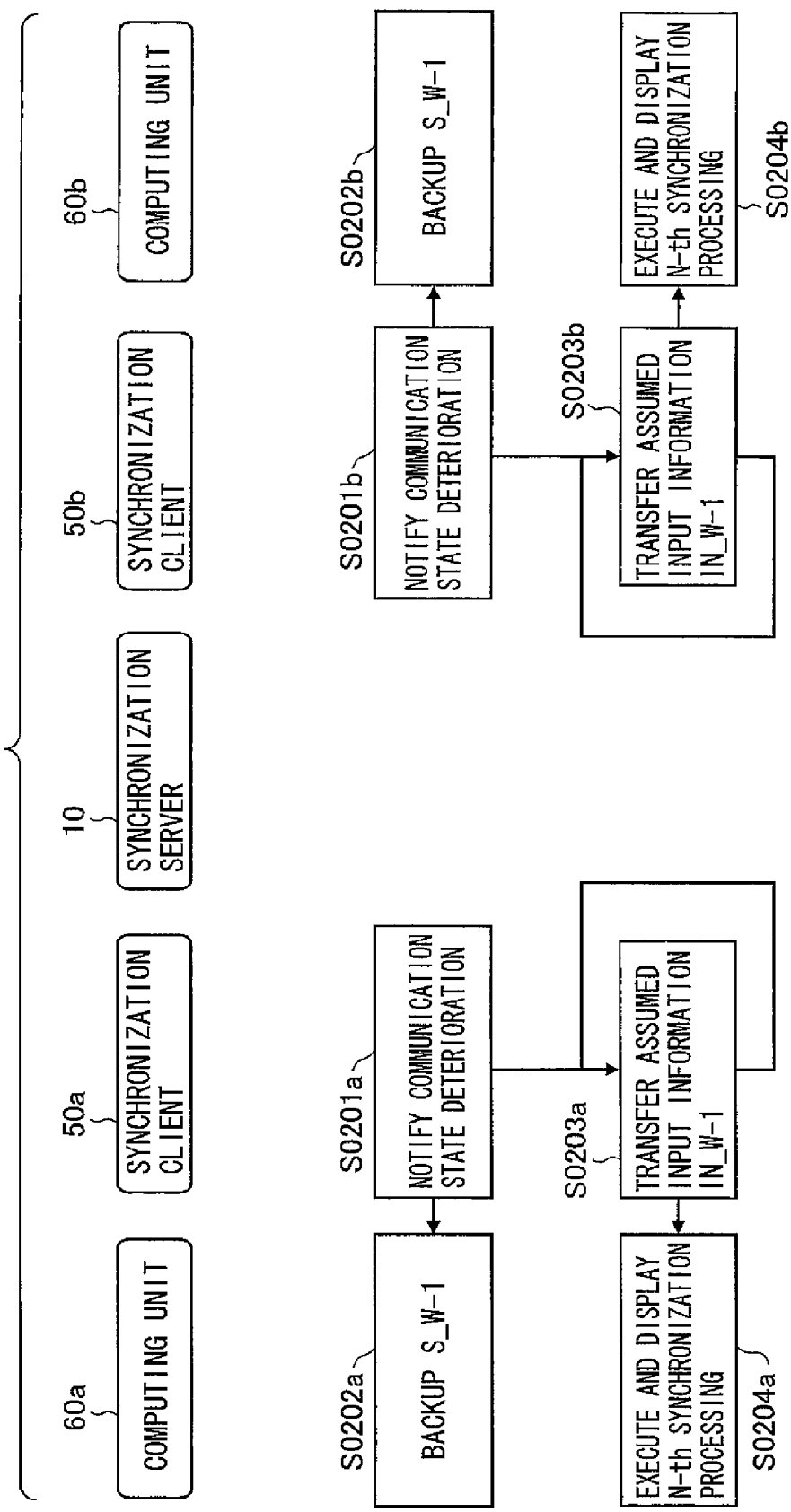
FIG. 4 is a workflow diagram explaining the operation of the synchronous communication game system illustrated in FIG. 1.
Figure 5:
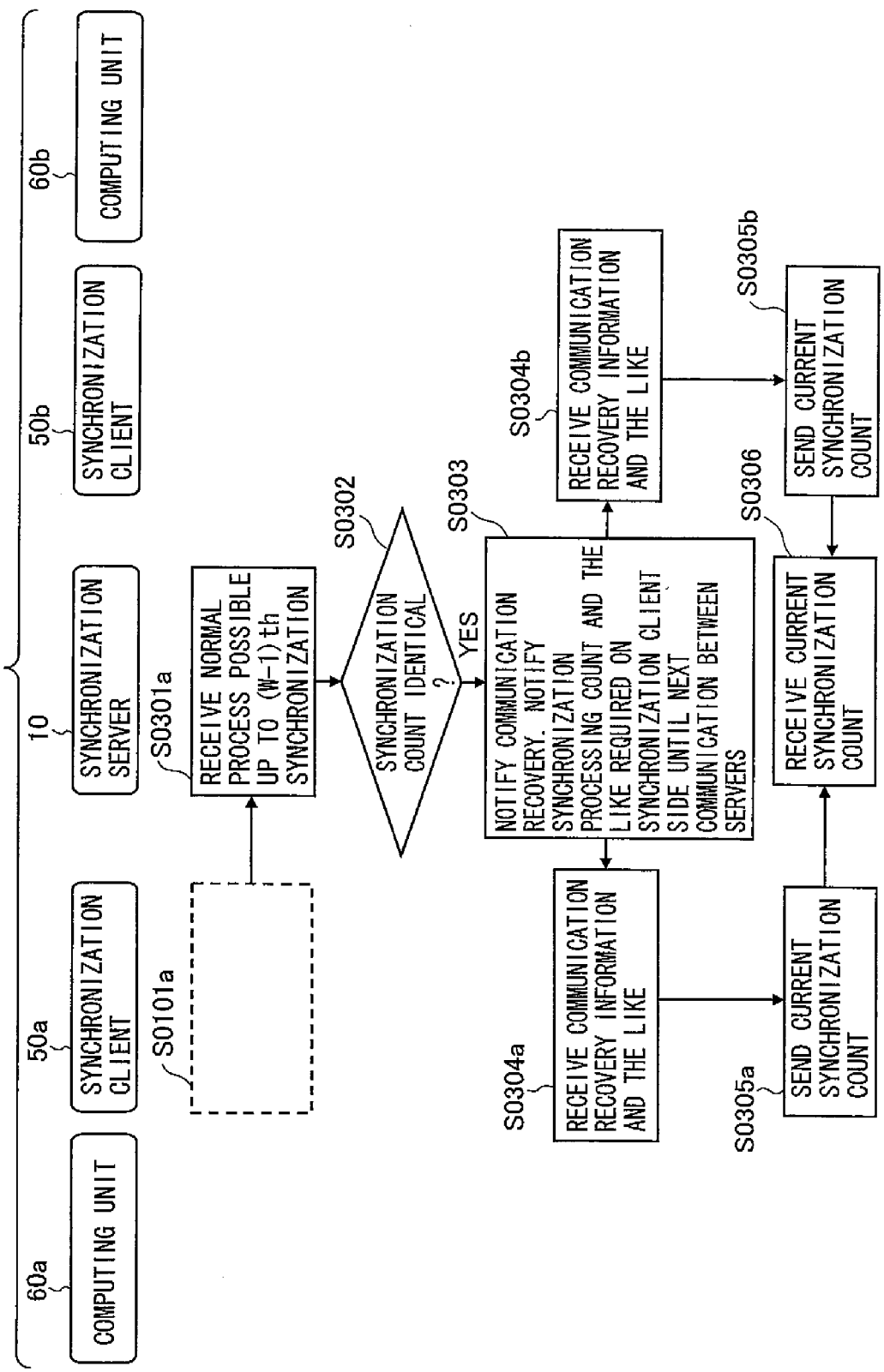
FIG. 5 is a workflow diagram explaining the operation of the synchronous communication game system illustrated in FIG. 1.

The operation continuing from FIG. 3 is explained next with reference to FIG. 4. The synchronization client 50*a* notifies the computing unit 60*a* that the communication state is deteriorated (step S0201*a*). The computing unit 60*a* backs up the immediately preceding game synchronization state S_W−1 currently held (step S0202*a*).

Owing to the communication state deterioration, the synchronization client 50*a* cannot create the input information INa_W. As a result, the immediately preceding input information (=INa_W−1=INa_W−1) is delivered instead to the computing unit 60*a* as "assumed input information" (step S0203*a*). The computing unit 60*a* executes computation on the basis of the assumed input information IN_W−1 instead of the regular input information, and calculates the game synchronization state at the W-th synchronization (step S0204*a*). Since the synchronization state Sa_W calculated herein is calculated using an "assumed input information", the value in the information terminal 30a becomes "provisional". In the synchronization client 50a, the synchronization count W advances to W+1 and the next provisional synchronization processes (steps S0203a~) are repeated in the same way. That is, the synchronization state Sa_N at the "provisional" N-th synchronization is repeatedly calculated using the assumed input information IN_W−1. Synchronization processing can thus be continued without temporary pausing even when the communication state becomes temporarily deteriorated.

Likewise, the synchronization client 50b notifies the deterioration of the communication state (step S0201b), the synchronization state is backed up (step S0202b), and provisional synchronization processing is repeated using "assumed input information" (steps S0203b). These repetitions are carried out until the communication state recovers.

The operation after recovery of the communication state is explained next with reference to FIGS. 5 to 8.

As a result of communication state recovery, data to the effect of "could be processed normally on the information terminal 30a side until the (W−1)th synchronization", transmitted in step S0101a of FIG. 3, arrives at the synchronization server 10 (step S0301a).

The synchronization server 10 judges whether or not all the synchronization counts carried out normally in the synchronization clients 50 are identical counts (step S0302). In the present embodiment, all synchronizations were carried out normally in the synchronization client 50 up to the (W−1)th synchronization. From the Wth, synchronization is carried out provisional synchronization processing using "assumed input", and it is considered that the synchronization counts performed normally do match. In this case it is ensured that the same input information has continued to be delivered to all the synchronization clients 50 (i.e. that the input information INa_N=the input information INb_N), and that the synchronization states are identical (i.e., that the synchronization state Sa_N=the synchronization state Sb_N).

After equalization of the synchronization counts in all the synchronization clients 50, thus, an identical synchronization state can be maintained in all the synchronization clients 50 by recommencing the ordinary synchronization processing. Therefore, the purpose of the subsequent processes is to equalize the synchronization counts for all the synchronization clients 50.

The synchronization server 10 transmits to all the synchronization clients 50 that communication is recovered (step S0303). Thereafter, the synchronization clients 50 communicate once with the synchronization server 10 (specifically, from step S0305 to step S0505), and during that communication the synchronization server 10 notifies the required synchronization processing count (step S0303). This count is estimated on the basis of the communication carried out theretofore between the server and the clients. If, for instance, one communication requires 70 ms and one synchronization processing requires 32 ms, 70 divided by 32 is 2, with remainder 6, and hence the synchronization count becomes 2+1=3 times. In the present example, this will be K times.

The synchronization server 10 transmits moreover data to the effect of up to what number of times the synchronization client 50 of the partner carried out synchronization processing normally, and up to what number of times the partner synchronization client 50 transmitted own synchronization information (step S0303).

At the point in time when the communication recovery notice is received from the synchronization server 10, the provisional synchronization count in the synchronization client 50a is set to M times. Similarly, the provisional synchronization count in the synchronization client 50b is set to L times. The synchronization client 50a receives from the synchronization server 10 the communication recovery notice (step S0304a), and sends back to the synchronization server 10 the synchronization count (=W+M−1) whose current process is finished (step S0305a). Similarly, the synchronization client 50b receives from the synchronization server 10 the communication recovery notice (step S0304b), and sends back to the synchronization server 10 the synchronization count (=W+L−1) whose current process is finished (step S0305b). The synchronization server 10 receives from all the synchronization clients 50 the synchronization counts of current processes that are finished (step S0306).

Each synchronization client 50 receives data to the effect of up to which time the partner has transmitted respective synchronization information in step S0304. Thus, each synchronization client 50 can learn how many synchronization clients 50 have not received yet the respective the information on the basis of the information transmitted by the partner to the synchronization client 50. Specifically, the synchronization client 50a does not receive the input information b_W, while the synchronization client 50b does not receive the input information a_W. The synchronization client 50a can receive the input information b_W through recovery of the communication state (step S0403a). Similarly, the synchronization server 10 can receive the input information a_W through recovery of the communication state (step S0402a).

Having received the input information a_W, the synchronization server 10 transmits the input information a_W to the synchronization client 50b (step S0402a). The synchronization client 50b receives the input information a_W (step S0403b). It should be noted that it is not necessary to wait until completion of these respective processes, and hence the processes below can be carried out in parallel thereto. The received a_W and b_W need not be kept, and are scrapped.

Until notification from the synchronization server 10 (step S0505a), the synchronization client 50a executes, and continues displaying, provisional synchronization processing using the assumed input information INa (steps S0501a, S0502a), to prevent temporary pausing of the synchronization processing. The same applies to the synchronization client 50b (step S0501b, step S0502b). In the meantime, the below-described process is carried out in parallel in the synchronization server 10 side.

In order to eliminate the difference (=L−M) between the received synchronization counts, the synchronization server 10 calculates how many times and with what speed each synchronization client 50 should thereafter carry out synchronization processing (step S0503). For instance, in a case where the count sent by the synchronization client 50a is 1036 and the count sent by the synchronization client 50b is 1039, the difference is 3 times. If in the synchronization client 50a one synchronization processing is carried out 9 times at a speed of 32 ms, while in the synchronization client 50b one synchronization processing is carried out 6 times at a speed of 48 ms, the synchronization count and the synchronization state in both synchronization clients 50 will finally coincide at an identical instant (=after 288 ms).

The synchronization server 10 notifies the calculated synchronization processing speed and synchronization count to each synchronization client 50 (step S0504). Meanwhile, as explained above, the synchronization client 50 repeats provisional synchronization processing using assumed input information INa, so as to prevent synchronization processing pausing (step S0501, step S0502). The notice from the synchronization server 10 is carried out within the synchronization count (=K times) calculated in step S0303. If the notice from the synchronization server 10 cannot be received within K times, the process pauses temporarily until the notice can be received. Accordingly K must be sufficiently large.

The synchronization client 50a receives from the synchronization server 10 the required synchronization processing speed and provisional synchronization processing count (=J times) that are necessary for adaptation to the synchronization count of the synchronization client 50b (step S0505a). After termination of the K-times provisional synchronization processing at the ordinary speed (step S0506, step S0507), the synchronization client 50a repeats J times provisional synchronization processing in accordance with the synchronization processing speed received from the synchronization server 10 (step S0601a, step S0602a).

The synchronization client 50b, similarly, receives from the synchronization server 10 a synchronization processing speed and a provisional synchronization processing count (=J−L+M times) (step S0505b). Similarly as well, after termination of the K-times provisional synchronization processing at the ordinary speed (step S0506, step S0507), the synchronization client 50b repeats (J−L+M) times provisional synchronization processing in accordance with the synchronization processing speed received from the synchronization server 10 (step S0601b, step S0602b).

At this point in time, the synchronization processing count in the synchronization client 50a is (W−1)+M+K+J times. The synchronization processing count in the synchronization client 50b is (W−1)+L+K+(J−L+M) times=(W−1)+M+K+J times, whereby the synchronization counts of the two synchronization clients 50 become identical. That is, the synchronization client 50a and the synchronization client 50b revert to a state in which they share the same synchronization state. Thenceforth, synchronization processing (step S0000a to step S0006a, and step S0000b to step S0006b) can be repeated as usual.

An effect is thus achieved whereby, even upon communication state deterioration, the process can continue without entering a standby state until reception of information from a partner and without temporarily pausing synchronization processing.

Figure 9:
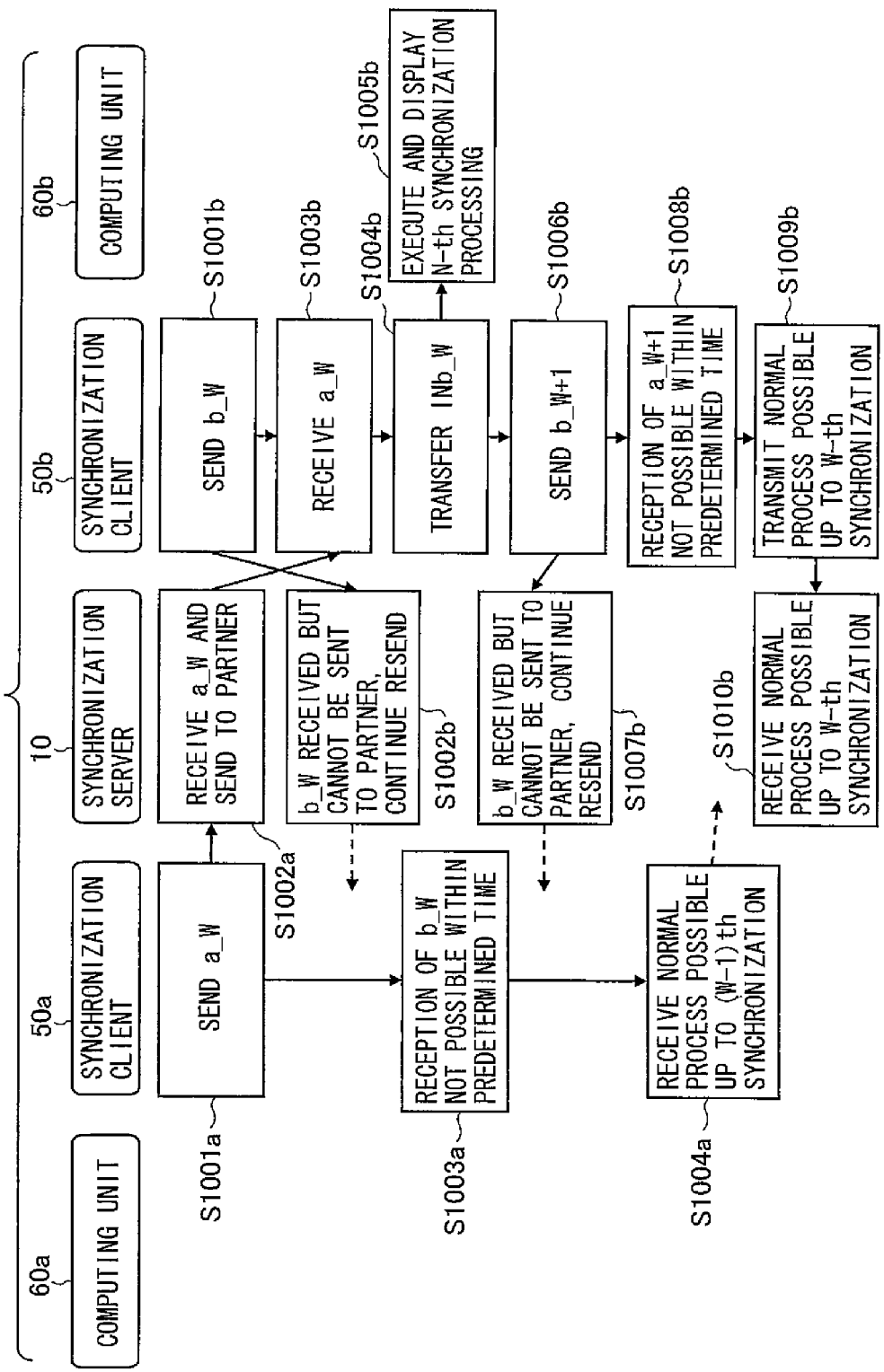
FIG. 9 is a workflow diagram explaining the operation of the synchronous communication game system illustrated in FIG. 1.
Figure 10:
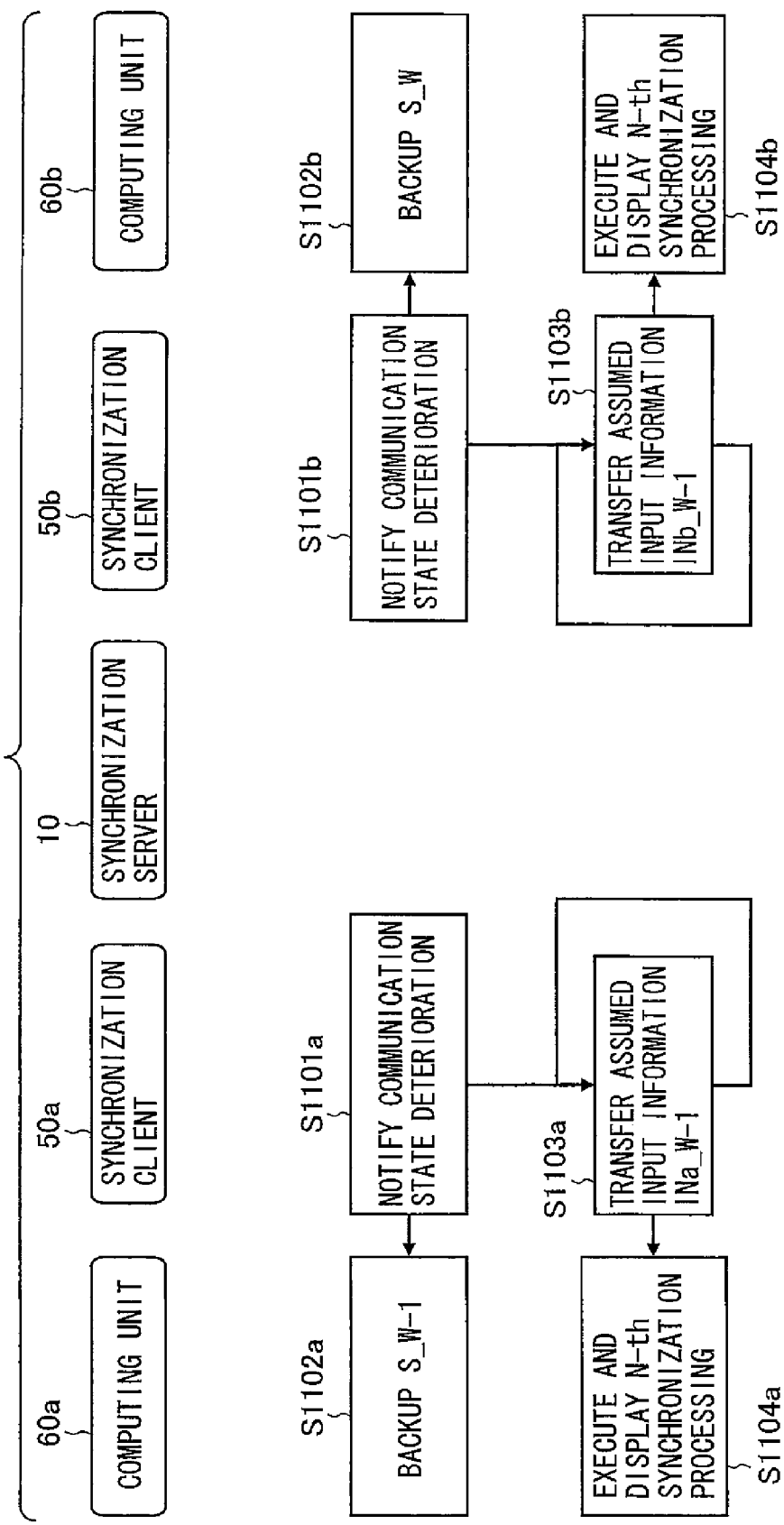
FIG. 10 is a workflow diagram explaining the operation of the synchronous communication game system illustrated in FIG. 1.

With reference to FIG. 9, an instance will be explained next in which the timing at which the communication state deteriorates is slightly offset compared to the previous instance.

Herein will be assumed a case where the synchronization count N is N=W. The synchronization client 50a sends input information a_W to the synchronization server 10 (step S1001a). The synchronization server 10 receives the input information a_W. This time, after completion of the reception of the input information a_W, the communication state supposedly deteriorates on the side of the information terminal 30a. The synchronization server 10 transmits the received input information a_W to the synchronization client 50b (step S1002a). Similarly, the synchronization client 50b sends input information b_W to the synchronization server (step S1001b). The synchronization server receives the input information b_W, but since the communication state on the side of the information terminal 30a is already deteriorated, the server cannot send the input information b_W to a partner (step S1002b).

Since the communication state has deteriorated, the synchronization client 50a cannot receive the input information b_W within a predetermined time (step S1003a)

Meanwhile, the synchronization client 50b can receive the input information a_W (step S1003b), and hence can create synchronization input information INb_W (step S1004b). The computing unit 60b receives the synchronization input information INb_W executes the normal process of the W-th synchronization, and displays the state of the W-th synchronization (step S1005b). As a result, the synchronization count of the synchronization client 50b is ahead of that of the synchronization client 50a by one count.

Next, the synchronization client 50b advances the synchronization count to W+1, and sends input information b_W+1 to the synchronization server 10 (step S1006b). The synchronization server 10 receives the input information b_W+1 but, since the communication state on the side of the information terminal 30a is deteriorated, as in the previous time, the synchronization server 10 cannot send the input information b_W to the synchronization client 50a (step S1007b).

The synchronization client 50a, which cannot receive the input information b_W (step S1003a), judges that the communication state is deteriorated. As a result, processing for preventing temporary pausing of synchronization is subsequently carried out. As described above, to the synchronization server 10 is transmitted data to the effect of that normal processing was possible up to the (W−1)th synchronization (step S1004a). Since the communication state is actually deteriorated, the synchronization client 50a continues retransmitting.

Meanwhile, the synchronization client 50b cannot receive the input information a_W within a predetermined time (step S1008b). Likewise, the synchronization client 50b judges that the communication state is deteriorated, and transmits to the synchronization server 10 data to the effect that normal processing was possible up to the W-th synchronization (step S1009b).

Note herein that while in the synchronization client 50a normal processing was possible up to the (W−1)th synchronization, in the synchronization client 50b normal processing was possible up to the W-th synchronization.

The synchronization client 50a notifies the computing unit 60a that the communication state is deteriorated (step S1101a). The computing unit 60a backs up the immediately preceding synchronization state S_W−1 (step S1102a). In order to prevent temporary pausing of the synchronization processing, the synchronization client 50a performs provisional synchronization processing, as in the previous time, using the immediately preceding synchronization input information IN_W−1 as "assumed input information" (step S1103a, step S1104a).

The synchronization client 50b notifies similarly to the computing unit 60b that the communication state is deteriorated (step S1101b). The computing unit 60b backs up the immediately preceding synchronization state S_W (step S1102b). Note that whereas the computing unit 60a backs up the synchronization state when the synchronization count is W−1, the computing unit 60b backs up the synchronization state when the synchronization count is W.

In order to prevent temporary pausing of the synchronization processing, the synchronization client 50b performs provisional synchronization processing using the immediately preceding synchronization input information IN_W as "assumed input information" (step S1103b, step S1104b).

Note that whereas the synchronization client 50a uses synchronization input information IN_W−1 as the "assumed input information", the synchronization client 50b uses the synchronization input information IN_W as the "assumed input information".

Figure 11:
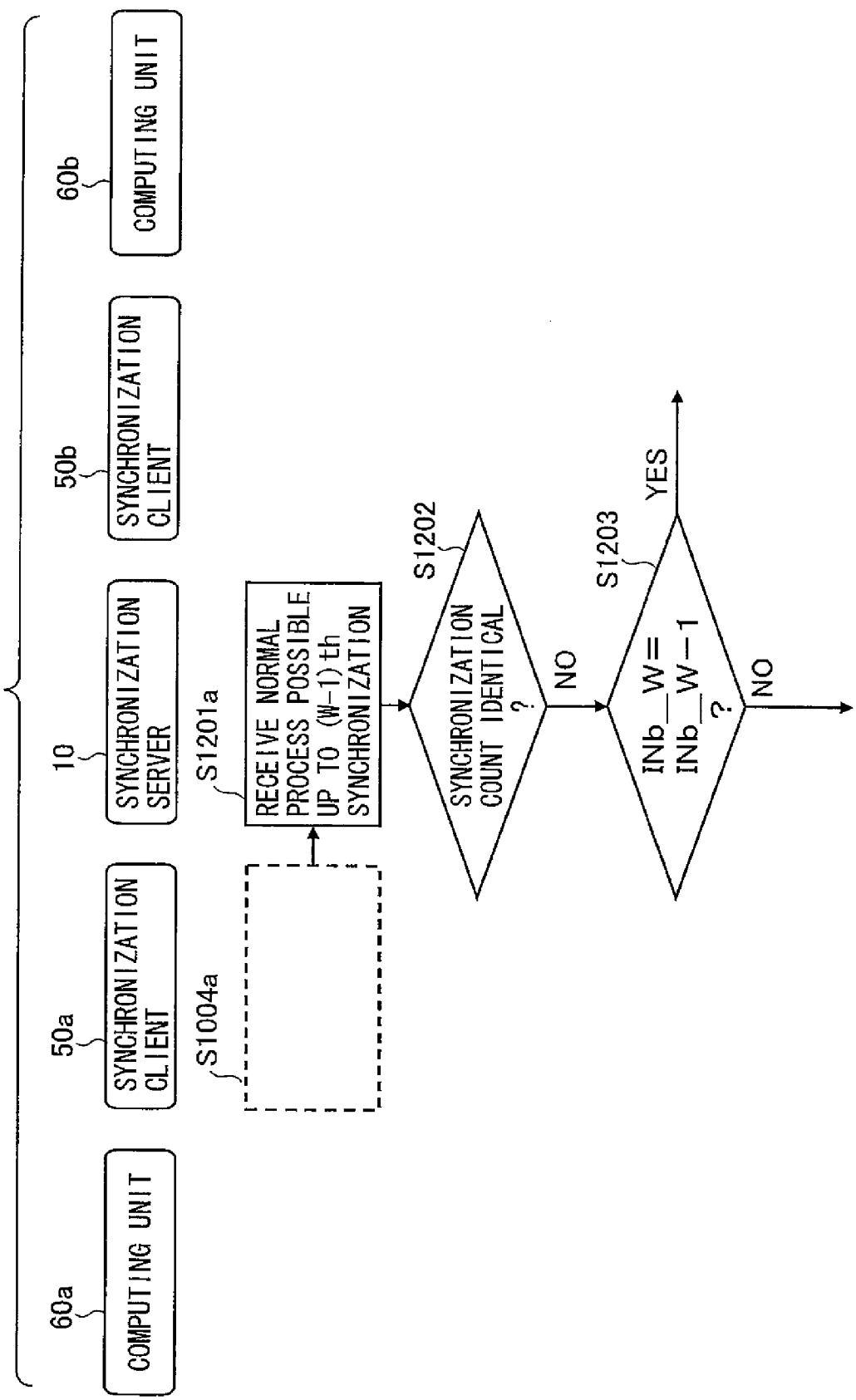
FIG. 11 is a workflow diagram explaining the operation of the synchronous communication game system illustrated in FIG. 1.

A situation after communication state recovery is explained next with reference to FIG. 11.

As a result of communication state recovery, data to the effect of "could be processed normally on the information terminal 30a side until the (W−1)th synchronization", transmitted in step S1004a of FIG. 9, arrives at the synchronization server 10 (step S1201*a*). The synchronization server 10 judges whether or not all the synchronization counts carried out normally in the synchronization clients are identical counts (step S1202). In the present example, on the side of the information terminal 30*b* processing is carried out normally up to the W-th synchronization, against the (W−1)th synchronization for the information terminal 30*a* side. The synchronization server 10 checks whether the synchronization input information INb_W has the same input content as the synchronization input information INb_W−1 (step S1203).

A case is considered now where the synchronization input information INB_W is identical to the synchronization input information INb_W−1. After notification of communication state deterioration (step S1101*a*), the synchronization input information INa_W−1 continues being used as the "assumed input information" in the information terminal 30*a* side. Meanwhile, the synchronization input information INb_W continues being used as the "assumed input information" in the information terminal 30*b* side. Herein, although the synchronization counts W−1 and W of the "assumed input information" used respectively in the information terminal 30*a* side and the information terminal 30*b* side are not identical, the input information kept on being used by the two terminals becomes identical. That is because the synchronization input information INB_W=synchronization input information INb_W−1, and the synchronization input information INa_W−1=synchronization input information INb_W−1 (note that, since synchronization processing can be carried out normally up to the (W−1)th synchronization, the input information is identical on both sides). Accordingly, synchronization input information INa_N=synchronization input information INB_N is ensured, and synchronization state Sa_N=synchronization state Sb_N is ensured, for any arbitrary synchronization count N.

After equalization of the synchronization counts in all the synchronization clients 50, thus, an identical synchronization state can be maintained in all the synchronization clients 50 by recommencing the ordinary synchronization processing. This situation is completely identical to that of the above example (FIG. 5), and hence recommencement of ordinary synchronization processing can be ushered in by carrying out the same processes (step S0303 to step S0306 in FIG. 7 and FIG. 8). Unlike in the above explanation, the synchronization client 50*b* transmits herein up to the input information b_W+1 (step S1006*b*) (compare with step S0101*b*, step S1001*b*, step S1006*b*).

Figure 6:
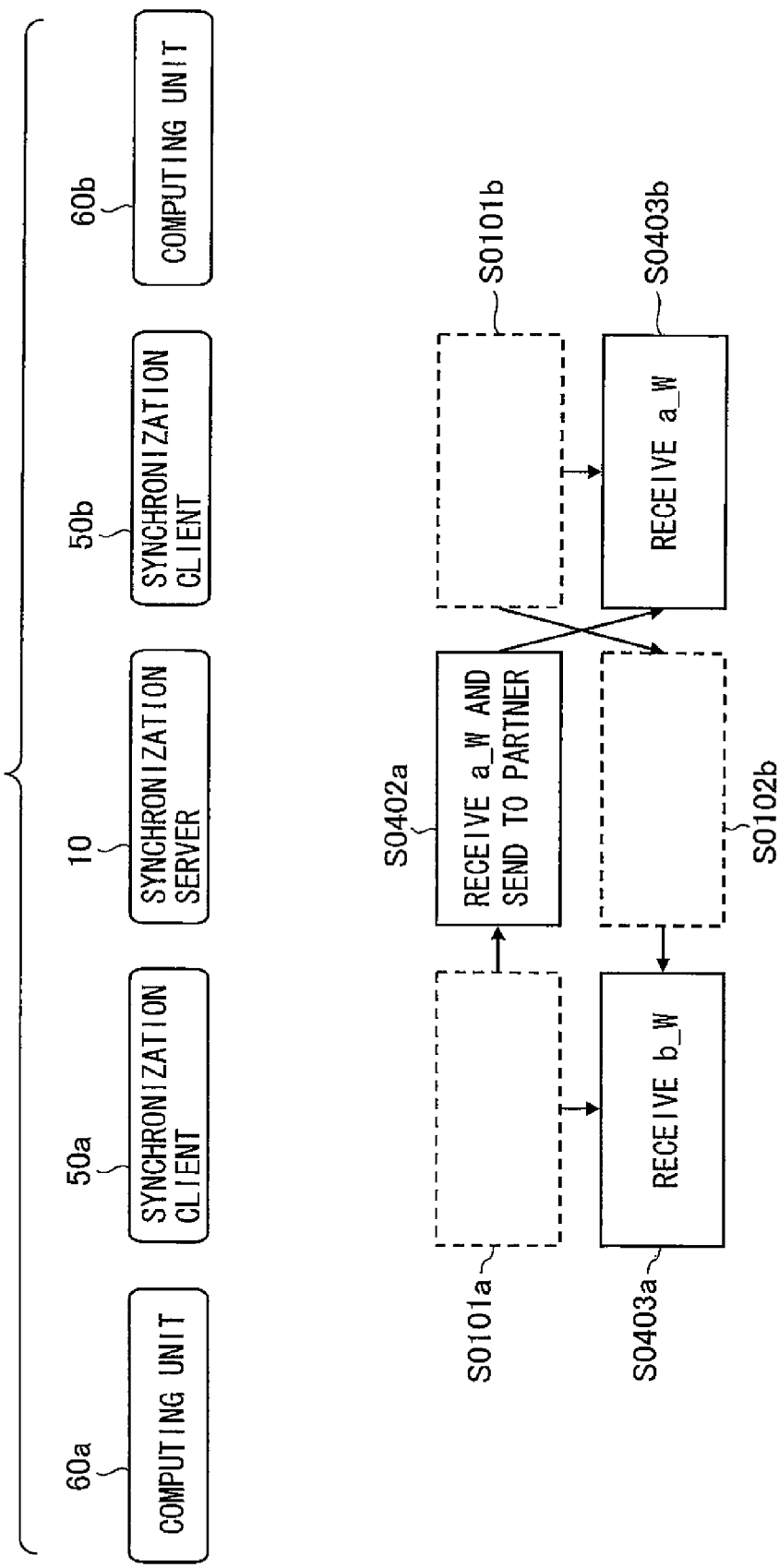
FIG. 6 is a workflow diagram explaining the operation of the synchronous communication game system illustrated in FIG. 1.
Figure 12:
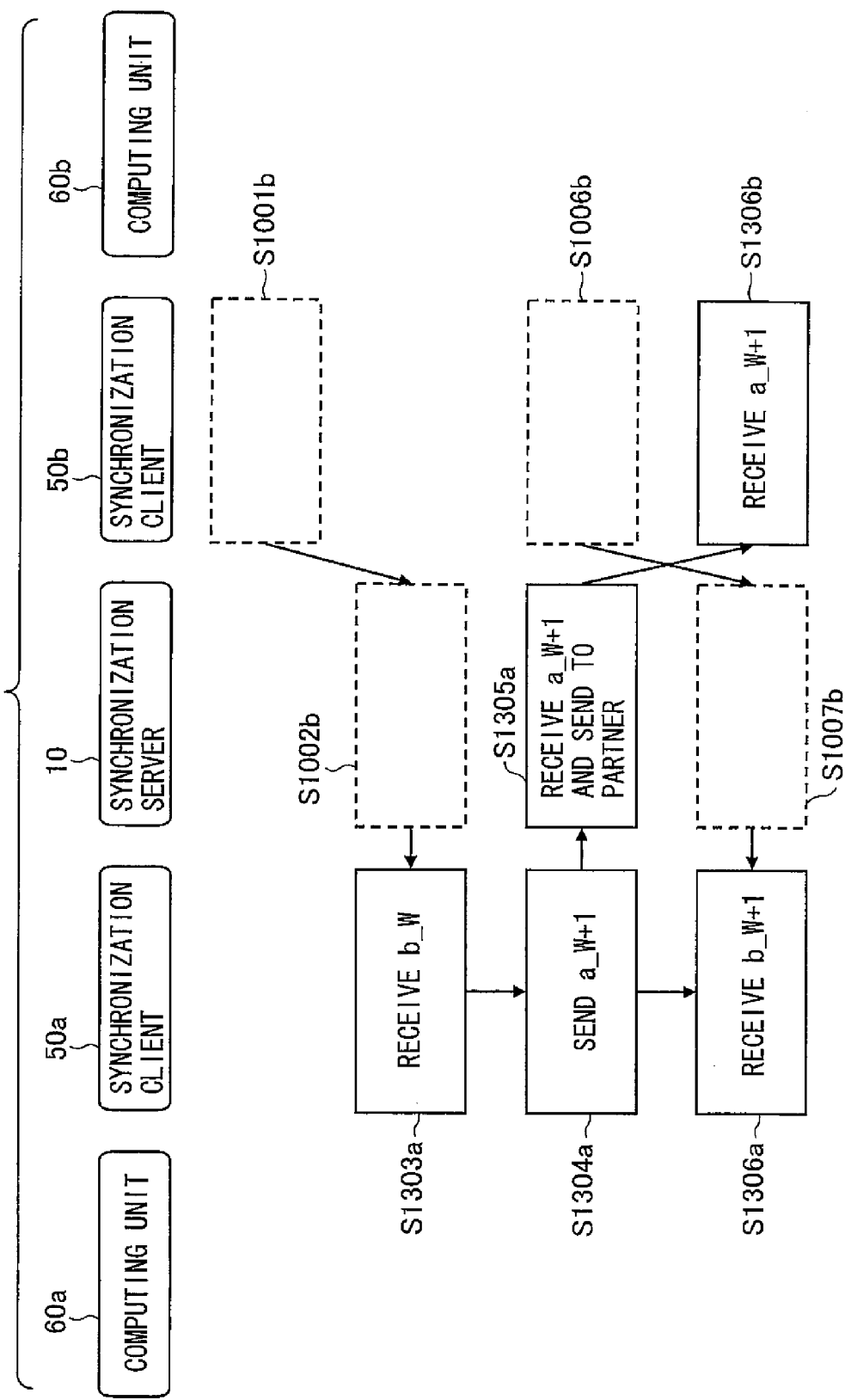
FIG. 12 is a workflow diagram explaining the operation of the synchronous communication game system illustrated in FIG. 1.

The process corresponding to the processes explained in FIG. 6 is described next with reference to FIG. 12. Each synchronization client 50 receives data to the effect of up to which time the partner has transmitted respective synchronization information in step S0304. Thus, each synchronization client 50 can learn how many synchronization clients 50 have not received yet the respective the information on the basis of the information transmitted by the partner to the synchronization client 50. Specifically, the synchronization client 50*a* does not receive the input information b_W and the input information b_W+1, while the synchronization client 50*b* does not receive the input information a_W+1. Note that although the synchronization client 50*a* can learn that the partner is waiting until reception of the input information a_W+1, at this moment the input information a_W+1 has not yet been sent.

Through the recovery of the communication state, the synchronization client 50*a* can receive the input information b_W (step S1303*a*). Next, since the synchronization client 50*b* is waiting for receiving the input information a_W+1, the synchronization client 50*a* sends the input information a_W+1 (step S1304*a*). The synchronization server 10 receives the input information a_W+1 and sends it to the partner (step S1305*a*). The synchronization client 50*b* receives the input information a_W+1 (step S1306*b*). The synchronization client 50*a* receives the input information b_W+1 sent in step S1007*b* (step S1306*a*). The above process allows clearing all the transmission/reception wait states.

A case is explained next in which the synchronization input information INb_W and the synchronization input information INb_W−1 are not identical in step S1203. In this case, the synchronization input information INa_N and the synchronization input information INb_N become non-identical for N equal to or larger than W. That is, differing input information has been continuously delivered to the respective synchronization clients 50. Accordingly, the synchronization state Sa_N and the synchronization state Sb_N cannot be ensured to be identical for N equal to or larger than W. It becomes then necessary to recommence ordinary synchronization processing by returning the synchronization state in each synchronization client 50 to the backed up state immediately prior to communication state deterioration.

Upon sudden returning, in this condition, to a backed up state, the synchronization count of the synchronization client 50*a* returns to W−1 (step S1102*a*) but, by contrast, the synchronization count of the synchronization client 50*b* returns only to W (step S1102*b*).

Next, the synchronization client 50*b* returns to the reception wait state for the input information a_W+1 (continuation of step S1008*b*). In order for the input information a_W+1 to arrive to the synchronization client 50*b*, the synchronization client 50*a* must receive the input information b_W, and after carrying out computation for the synchronization count W, must send the input information a_W+1, via the synchronization server 10, to the synchronization client 50*b*. This operation takes ordinarily a long time, and hence, if the synchronization client 50*b* cannot receive the input information a_W+1 within a predetermined time, it may erroneously judge that the communication state is deteriorated again, thereupon initiating once more the process for preventing temporary pausing of the synchronization processing.

This situation may precipitate a chain of temporary pause prevention processes that may result in no input processes being received at all. Accordingly the following procedure is employed for recommencing synchronization processing from a situation such that no temporary pause prevention processes are started again.

Figure 13:
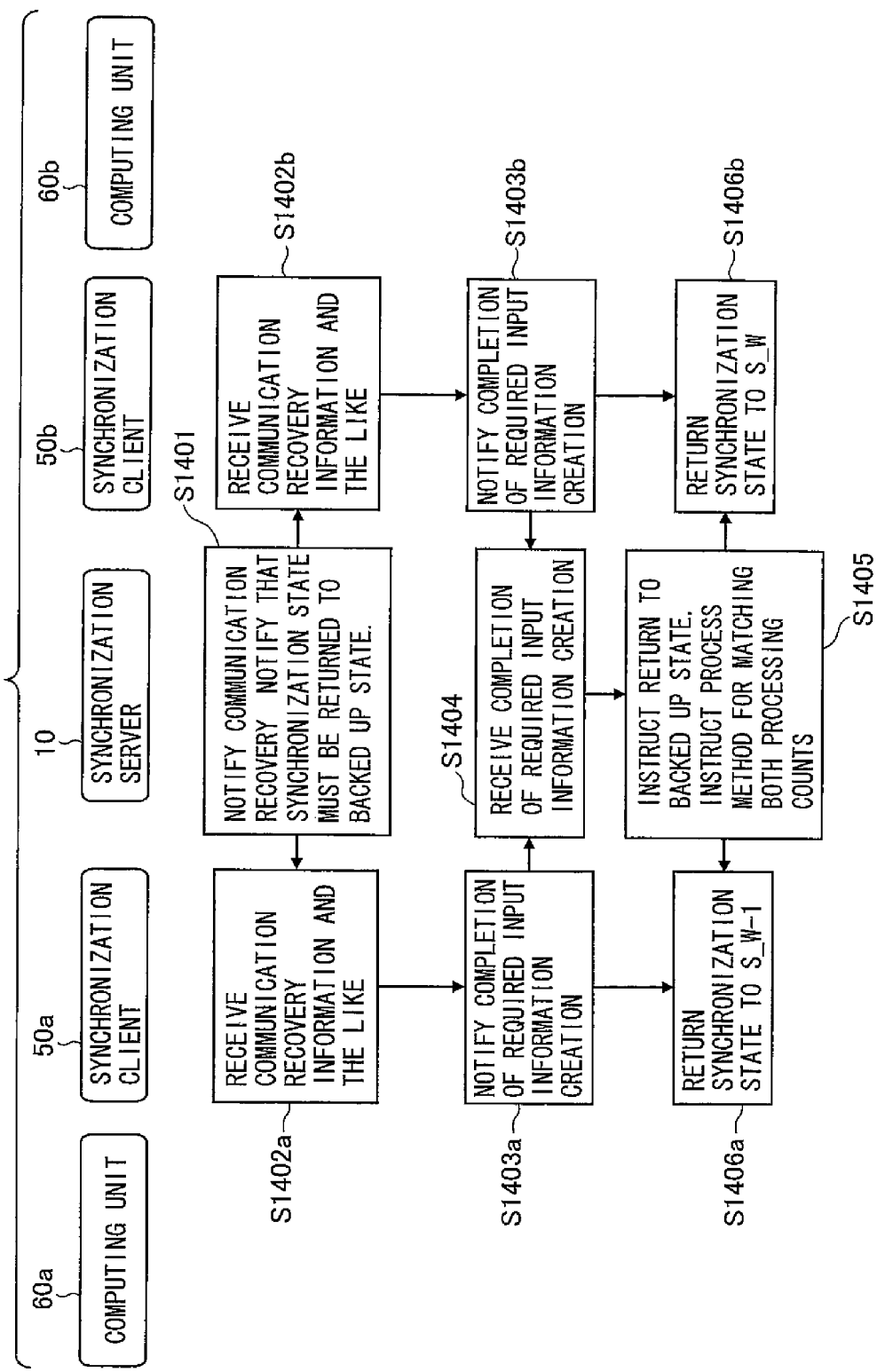
FIG. 13 is a workflow diagram explaining the operation of the synchronous communication game system illustrated in FIG. 1.

A process for achieving the above goal is explained next with reference to FIG. 13

The synchronization server 10 notifies the synchronization client 50 that the communication state is recovered (step S1401) and that it is necessary to return the synchronization state to the backed up state in step S1102 (step S1401).

The synchronization client 50 receives data to the effect that the communication state is recovered (step S1402), and learns that it is necessary to return to the backed up state.

Figure 14:
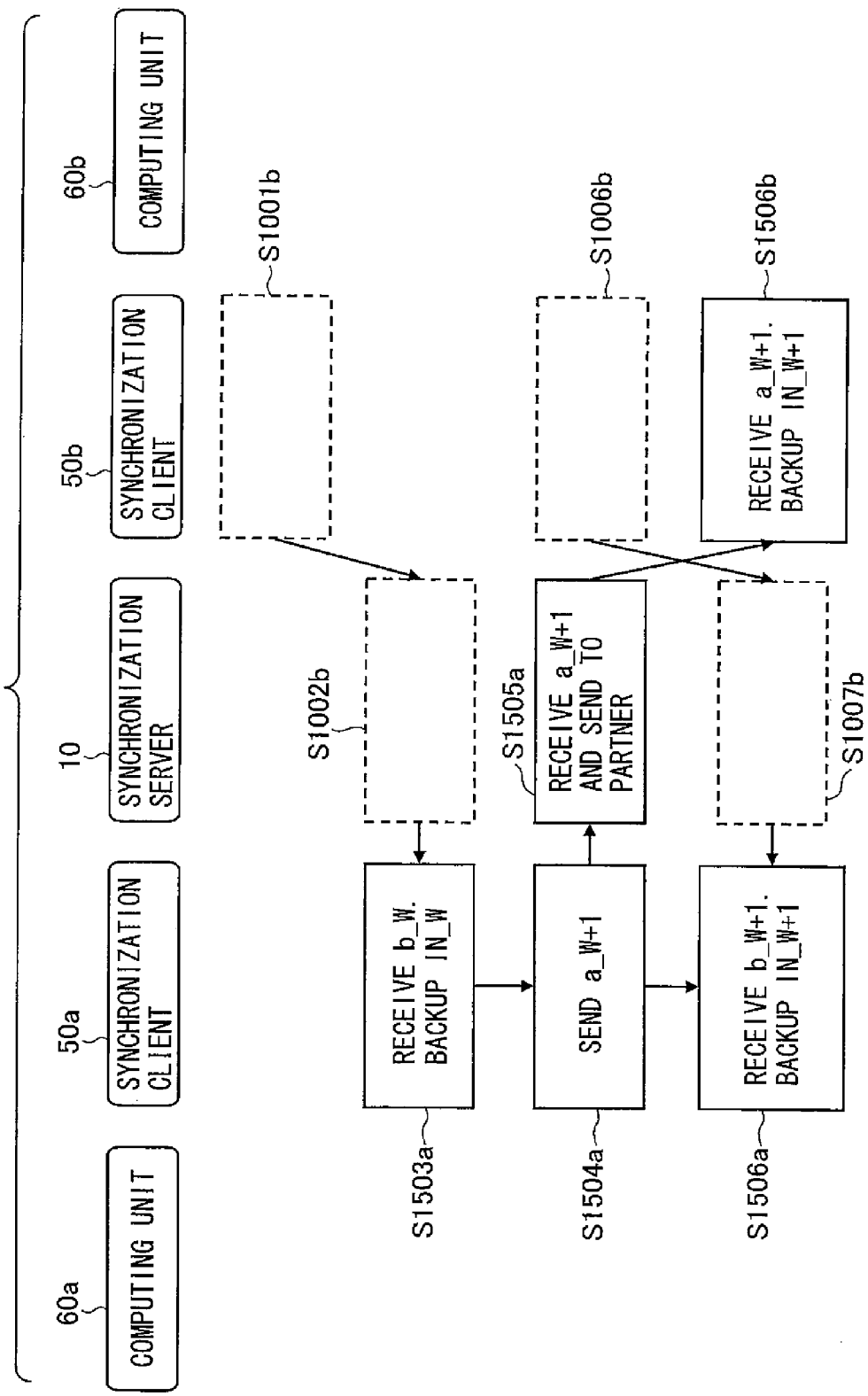
FIG. 14 is a workflow diagram explaining the operation of the synchronous communication game system illustrated in FIG. 1.

A process for harmonizing the synchronization input information with the partner in each synchronization client 50 is explained next with reference to FIG. 14.

The synchronization client 50*a* receives the input information b_W sent in step S1002*b* (step S1503*a*). This allows creating synchronization input information IN_W, which is backed up for later use (step S1503*a*).

Next, the synchronization client 50*a* sends input information a_W+1 (step S1504*a*). The synchronization server 10 receives the input information a_W+1 and sends it to the synchronization client 50*b* (step S1505*a*). The synchronization client 50*b* receives the synchronization input information a_W+1 (step S1506b). This allows creating synchronization input information IN_W+1, which is backed up for later use (step S1506b).

Next, the synchronization client 50a receives the b_W+1 sent in the step S1007b (step S1506a). Similarly, synchronization input information IN_W+1 can be created, and is also backed up for later use (step S1506a).

At this point in time, it has been possible to prepare input information up to the (W+1)th synchronization in the two synchronization clients 50. In these processes, provisional synchronization processing using "assumed input information" is carried out in each synchronization client 50 (step S1103a, step S1104a, step S1103b, step S1104b), so that temporary pausing of synchronization processing is prevented.

At the point in time when creation of the synchronization input information IN_W+1 of the (W+1)th synchronization is completed in each synchronization client 50, the synchronization server 10 is notified of the completion (step S1403a, step 1403b). The synchronization server 10 receives from all the synchronization clients 50 that creation of the necessary input information is complete (step S1404). After return to the backup condition, and until return to ordinary synchronization processing, the synchronization server 10 calculates for each synchronization client 50 the synchronization processing speed and the times of synchronization processing that allow matching the synchronization counts at the same instant (step S1405). Specifically, the difference in the synchronization counts between the synchronization client 50a and the synchronization client 50b is 1 time. Therefore, the synchronization counts of the two synchronization clients, and also the synchronization state thereof, coincide after a lapse of 64 ms if 1 synchronization processing of 32 ms is performed twice in the synchronization client 50a while 1 synchronization processing of 64 ms is performed once in the synchronization client 50b. The synchronization server 10 notifies the result of the calculation to each synchronization client 50 (step S1405). The synchronization clients 50 receive an instruction of returning the synchronization state to the backed up state (S1406). The synchronization client 50a returns the synchronization state to S_W−1 (step S1406a). The synchronization client 50b returns the synchronization state to S_W (step S1406b).

Figure 15:
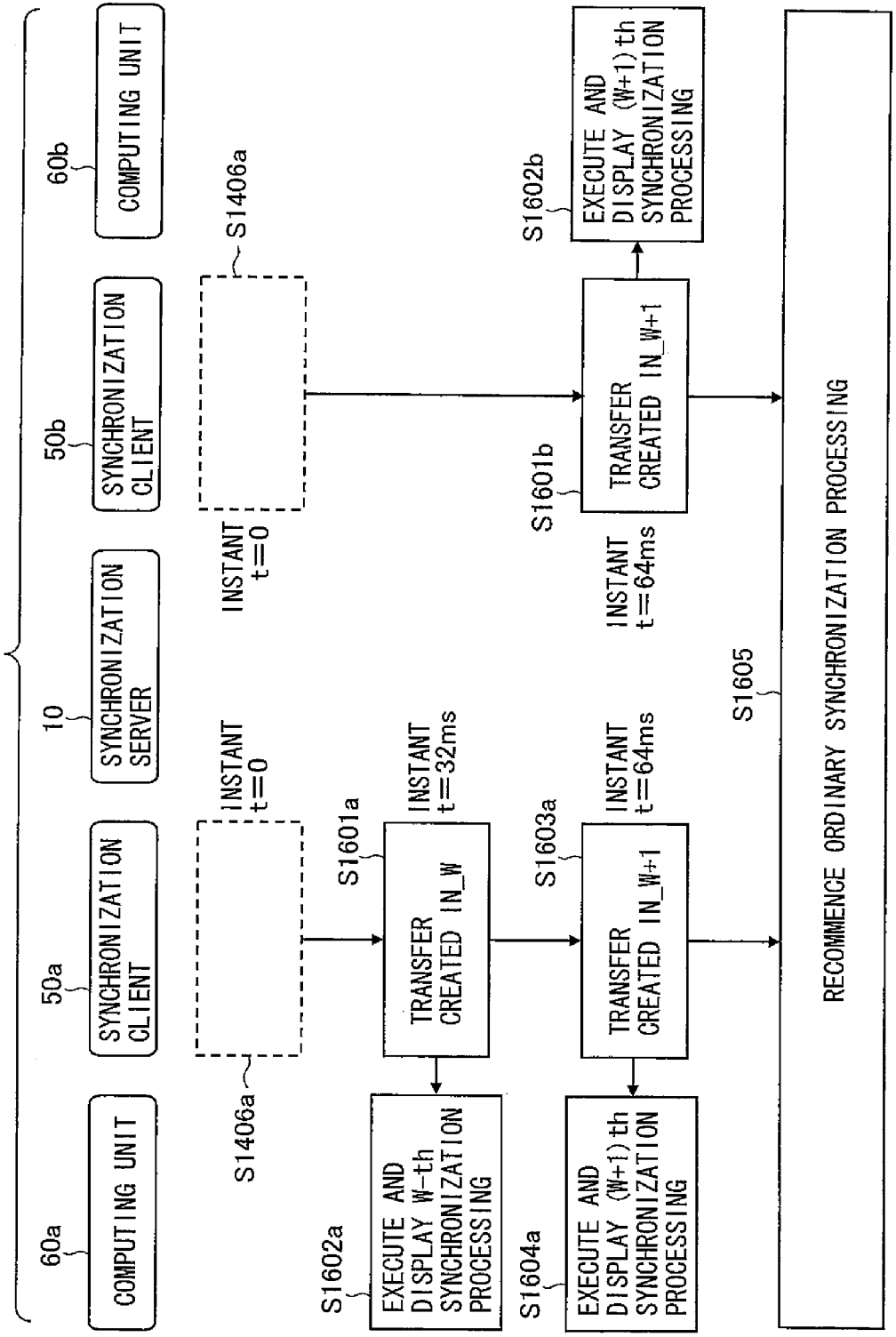
FIG. 15 is a workflow diagram explaining the operation of the synchronous communication game system illustrated in FIG. 1.
Figure 16:
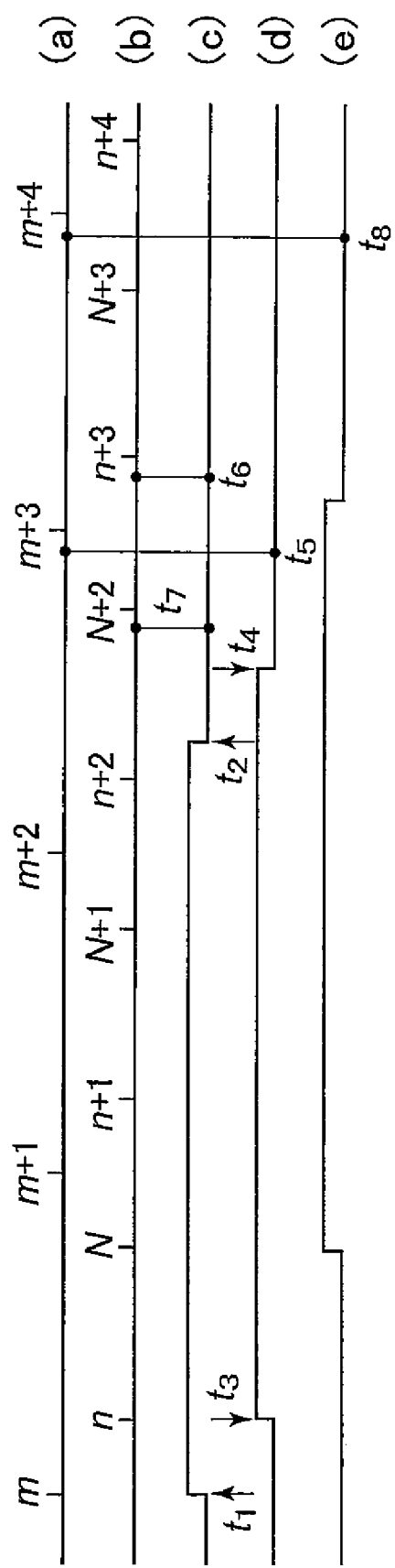
FIG. 16 is a timing chart illustrating data timing in a conventional synchronous communication game system.

The process until return to ordinary synchronization processing is explained next with reference to FIG. 15.

The instant t=0 ms is taken as the time at which the synchronization client 50 returns to the synchronization state. At the instant t=32 ms, the synchronization client 50a executes, and displays, the W-th synchronization processing (step S1601a, step S1602a) using the already created synchronization input information IN_W (step S1503a). At the instant t=64 ms, the synchronization client 50a executes, and displays, the (W+1)th synchronization processing (step S1603a, step S1604a) using the already created synchronization input information IN_W+1 (step S1506a), while the synchronization client 50b executes, and displays, the (W+1)th synchronization processing (step S1601b, step S1602b).

The synchronization counts and synchronization states of all the synchronization clients 50 can thus be equalized 64 ms after return of the synchronization states to the backed up state. By carrying out the ordinary process, thus, processing can continued thereafter without temporarily pausing the synchronization processing.

Example 2

Next is explained a second embodiment of the present invention in the form of a different synchronization processing operation using the synchronous communication game system illustrated in FIG. 1.

Figure 17:
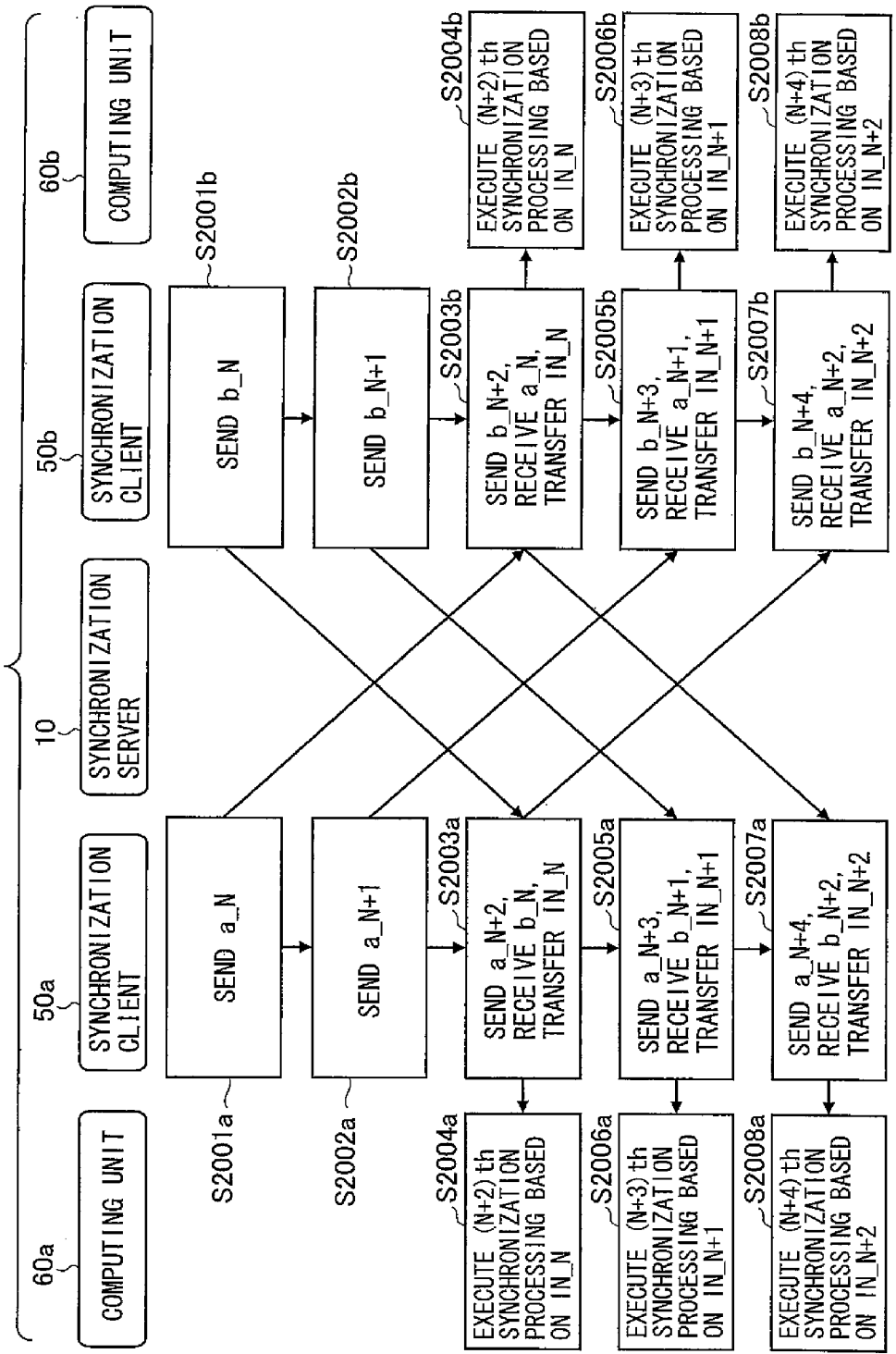
FIG. 17 is a workflow diagram explaining the operation of another embodiment of the synchronous communication game system illustrated in FIG. 1.

With reference to FIG. 17, an instance will be explained first in which the game progresses while using information inputted at the N-th synchronization in the process of the (N+m)th synchronization (wherein m is an integer>0). The synchronization server 10 performs relay processing in the same way as in the above-described embodiment (hereinafter referred to as first embodiment), so as to enable data exchange between the synchronization clients 50. For simplicity in the figure, this data relay process is not explained herein.

A specific case in which m=2 is explained next. Herein, (N+2)th synchronization processing is assumed to being currently carried out (step S2003a~ and step 2003b~). As the input information, the synchronization client 50a uses herein the input information IN_N (=a_N and b_N) of 2 synchronizations before, instead of IN_N+2. b_N is sent 2 synchronizations before by the synchronization client 50b (step S2001b). Thus, if between processing of the N-th synchronization and the (N+1)th synchronization b_N is sent to the synchronization client 50a, the process can advance without waiting for reception of the input information from the synchronization client 50b. The synchronization client 50a delivers IN_N instead of IN_N+2 to the computing unit 60a (step S2003a). The computing unit 60a carries out the process of the (N+2)th synchronization on the basis of IN_N (step S2004a). The same process is carried out in the synchronization client 50b. The same input information and the same synchronization state can thus be shared in all the synchronization clients 50.

Figure 18:
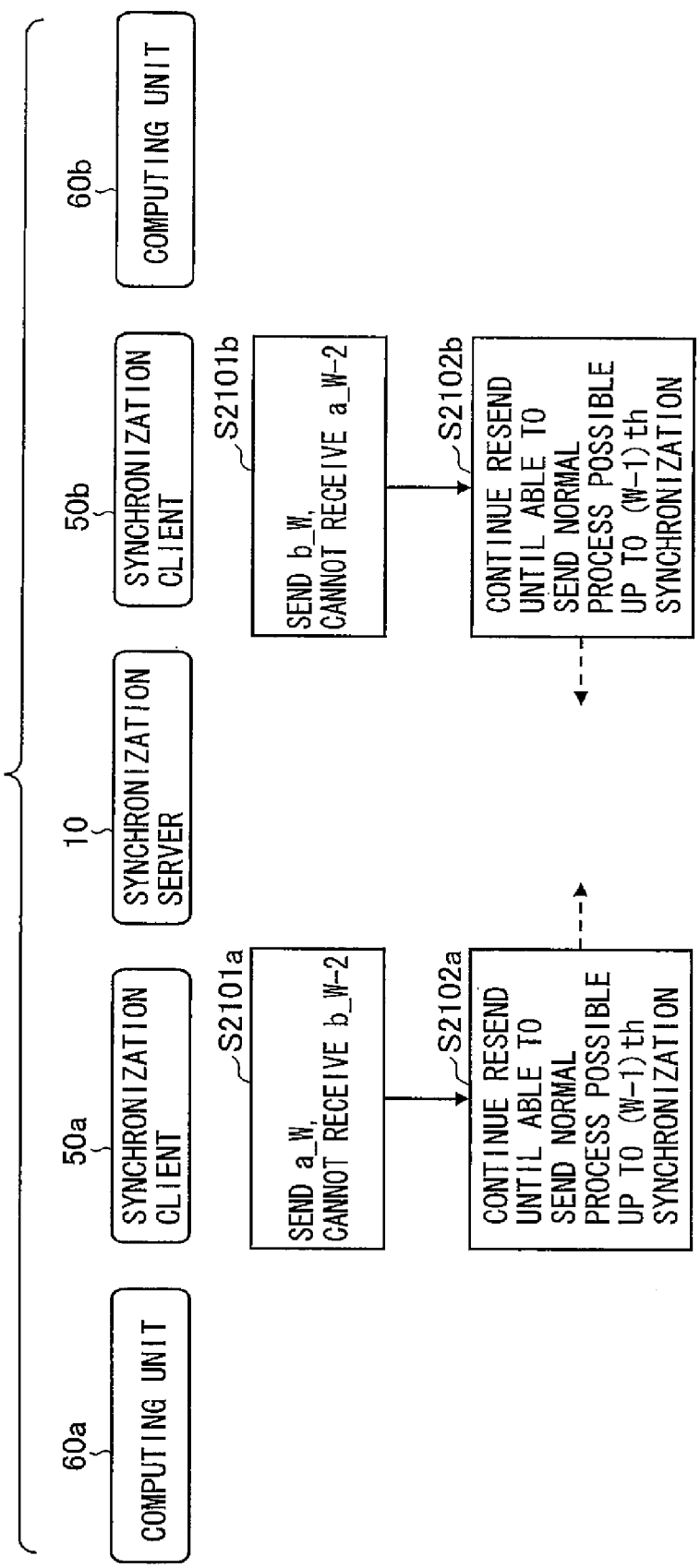
FIG. 18 is a workflow diagram explaining the operation of another embodiment of the synchronous communication game system illustrated in FIG. 1.
Figure 19:
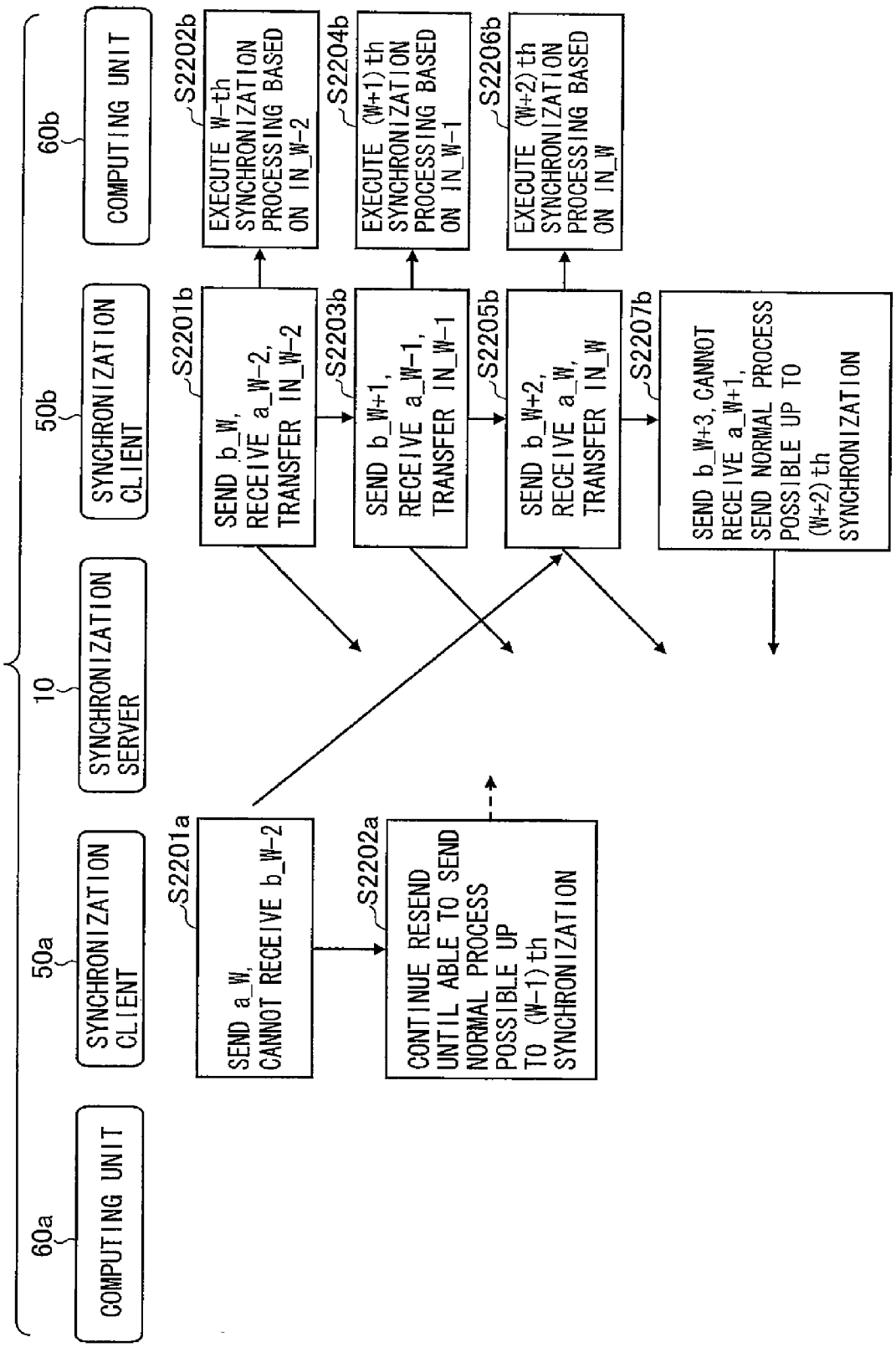
FIG. 19 is a workflow diagram explaining the operation of another embodiment of the synchronous communication game system illustrated in FIG. 1.

With reference to FIG. 18, an explanation follows below on the operation when the communication state between the synchronization client 50a and the synchronization server 10 deteriorates during the game. Specifically, herein is supposed that when the synchronization client 50a is about to perform the process of the W-th synchronization, a_W could be transmitted but b_W−2 could not be received (step S2101a). As in the above-described embodiment, the synchronization client 50a goes on retransmitting until it becomes possible to transmit to the synchronization server 10 that, on account of communication state deterioration, processing could be carried out normally up to the (W−1)th synchronization (step S2102a). Similarly, a temporary communication state deterioration is supposed to occur also between the synchronization client 50b and the synchronization server 10, and, likewise, herein is supposed the synchronization client 50b could transmit b_W but could not receive a_W−2 (step S2101b). As in the above-described embodiment, the synchronization client 50b goes on retransmitting until it becomes possible to transmit to the synchronization server 10 that, on account of communication state deterioration, processing could be carried out normally up to the (W−1)th synchronization (step S2102b).

As in the above-described embodiment, the synchronization client 50a notifies the computing unit 60a that the communication state is deteriorated (same as step S0201a). As in the above-described embodiment, the computing unit 60a backs up the immediately preceding game synchronization state S_W−1 (same as step S0202a). Likewise, the synchronization client 50b notifies the computing unit 60b that the communication state is deteriorated (same as step S0201b), and the computing unit 60b backs up S_W−1 (same as step S0202b). As in the above-described embodiment, the synchronization client 50a keeps transferring IN_W−1 to the computing unit 60a as the input information (same as step S0203a). As in the above-described embodiment, the computing unit 60a carries out the processes from the W-th synchronization on using the assumed input information IN_W−1 (same as step S0204a). Identical processing is carried out in the synchronization client 50b and the computing unit 60b. By carrying out processing using assumed input information instead of normal input information, temporary synchronization processing pausing can be prevented, thereby not annoying the user as a result of temporary screen stops or the like, even in case of communication state deterioration.

Here follows an explanation of the process carried out when the communication state between the synchronization client 50a and the synchronization server 10 has recovered, and when the communication state between the synchronization client 50b and the synchronization server 10 has recovered. As in the above-described embodiment, data to the effect of "could be processed normally until the (W−1)th synchronization", being transmitted in step S2102a, is sent by the synchronization client 50a to the synchronization server 10 (same as step S0301a). Similarly, the synchronization client 50b sends to the synchronization server 10 information to the effect of "could be processed normally until the (W−1)th synchronization", As in the above-described embodiment, the synchronization server 10 checks whether the synchronization counts carried out normally in all the synchronization clients 50 were identical (same as step S0302). In the present embodiment, the synchronization count carried out normally in all synchronization clients 50 is identical to W−1. As in the above-described embodiment, the synchronization server 10 notifies to the synchronization client 50 that communication is recovered, transmits the synchronization processing count (herein K times, as in the above-described embodiment) that is required on the synchronization client 50 side until the next communication between servers, and transmits up to what number of times the synchronization client 50 of the partner carried out synchronization normally (same as step S0303).

Having received the notification of communication recovery, each synchronization client 50 notifies the current synchronization count to the synchronization server 10, as in the above-described embodiment, and the synchronization server 10 receives these notices (same as step S0305a, step S0305b, step S0306). As in the above-described embodiment, herein too the provisional synchronization count in the synchronization client 50a is set to M times, and similarly, the provisional synchronization count in the synchronization client 50b is set to L times.

On the basis of information sent by the partner to the respective synchronization client 50, each synchronization client 50 receives notification, as in the above embodiment, that it has not yet received the information (same as step S0402a, step S0403a).

As in the above-described embodiment, the synchronization server 10 calculates the provisional synchronization processing count and speed required in each synchronization client 50 with a view of eliminating the difference (=L−M) between the received synchronization counts (same as step S0503). As in the above-described embodiment, the synchronization server 10 notifies the calculated synchronization processing speed and synchronization count to each synchronization client 50 (same as step S0504).

Figure 7:
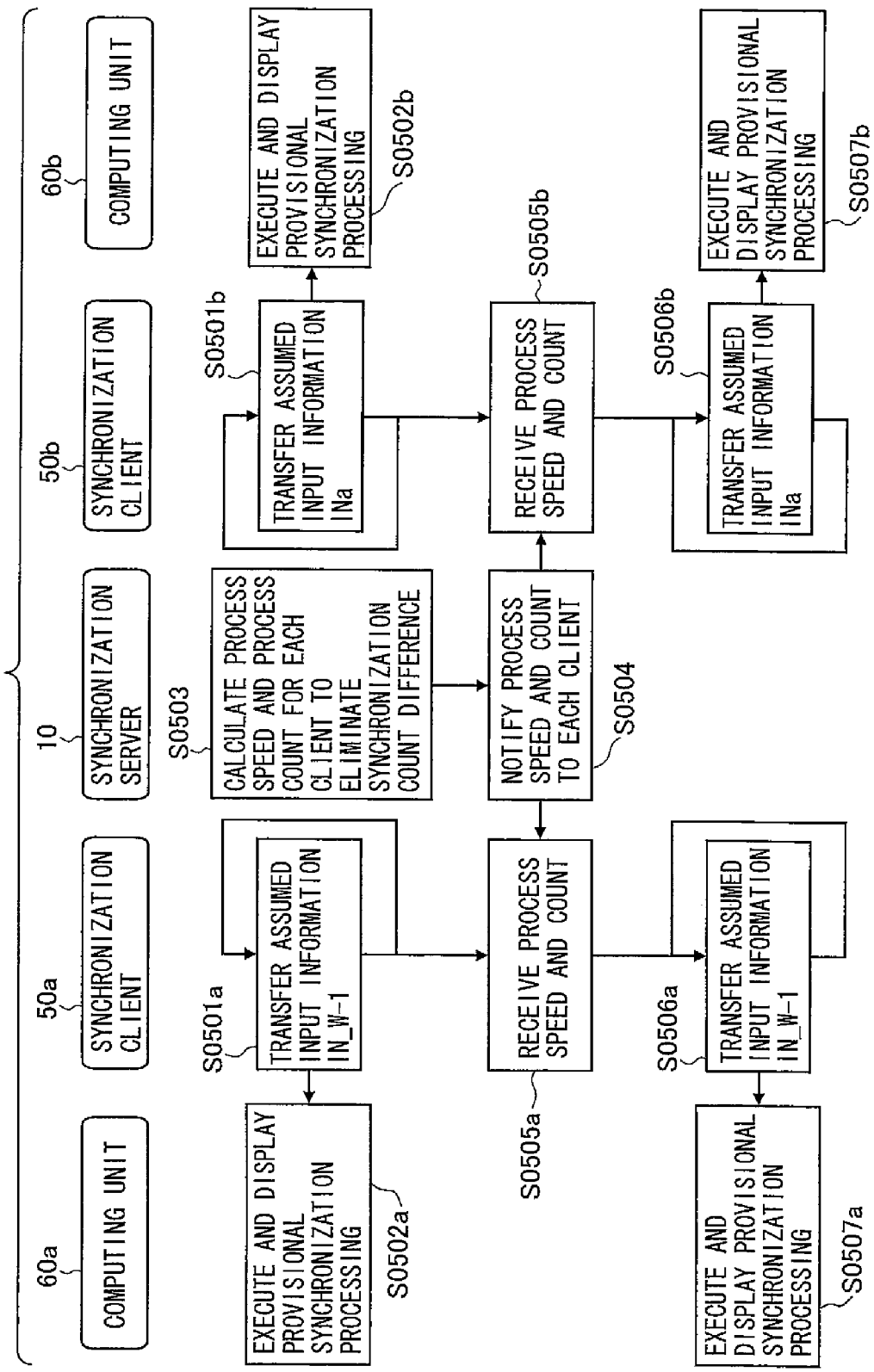
FIG. 7 is a workflow diagram explaining the operation of the synchronous communication game system illustrated in FIG. 1.
Figure 8:
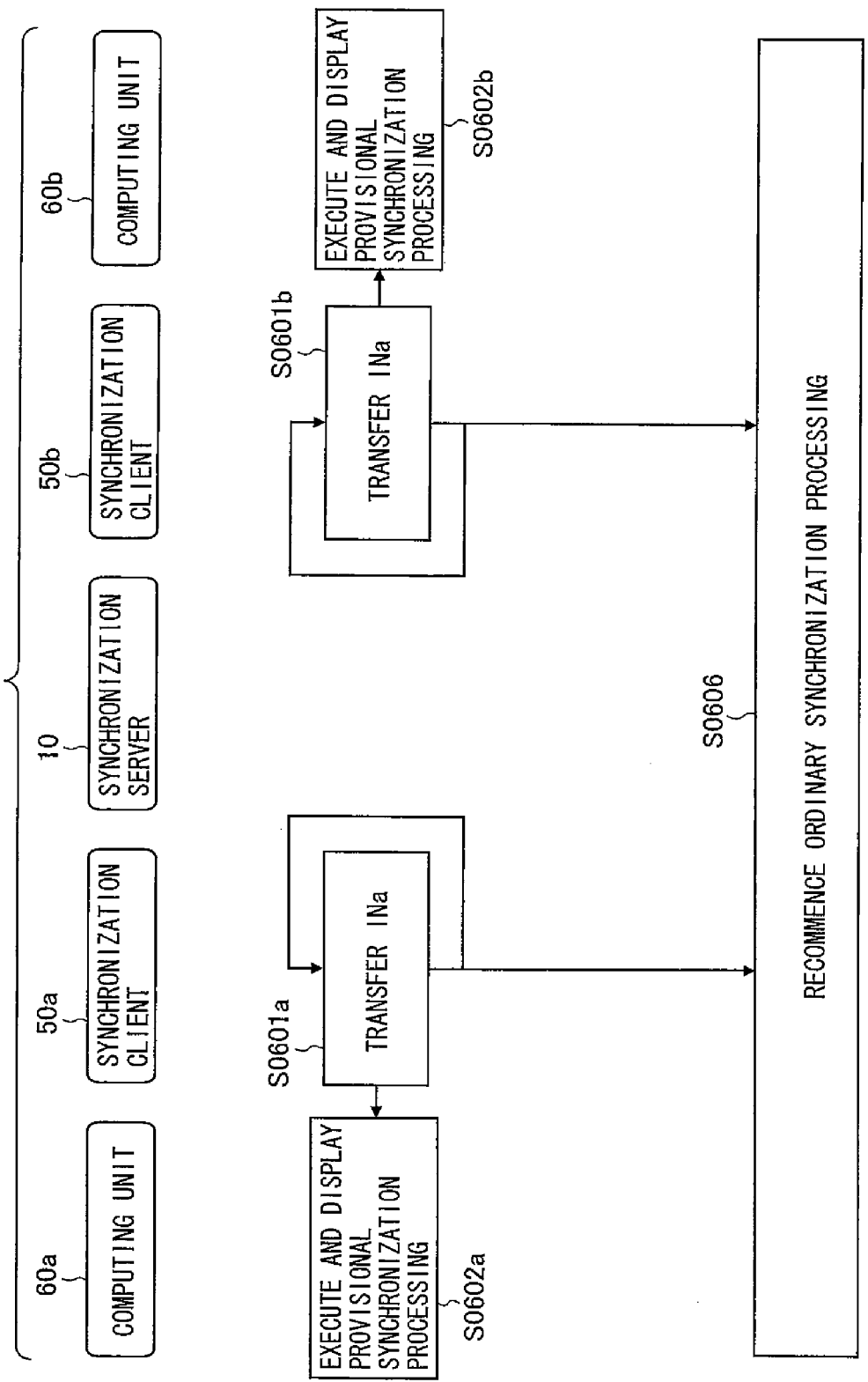
FIG. 8 is a workflow diagram explaining the operation of the synchronous communication game system illustrated in FIG. 1.

As in the above-described embodiment, after performing synchronization processing using assumed input information for the necessary number of times, each synchronization client 50 can recommence ordinary synchronization processing (same as FIGS. 7 and 8). The synchronization count upon recommencement of the synchronization processing is herein V times, In the present embodiment, the input information of the (V−m)th synchronization is used for carrying out the process of the V-th synchronization. Thus, it is preferable to put together beforehand the input information of the V−m, V−m+1, (V−1)th synchronizations during the interval until synchronization processing recommencement. Such a setting makes it unnecessary to wait until the input information of the (V−m)th synchronization arrives from the partner, in order to carry out the process of the V-th synchronization, and allows performing quickly the next synchronization processing.

A process method is explained next for an instance in which only the communication state between the synchronization client 50a and the synchronization server 10 deteriorates temporarily, in a case where m=2. Specifically, herein will be supposed that when the synchronization client 50a is to perform the synchronization processing for the W-th time, a_W could be transmitted, but b_W−2 could not be received (step S2201a). As in the above embodiment, the synchronization client 50a goes on retransmitting until it becomes possible to transmit to the synchronization server 10 that, on account of communication state deterioration, processing could be carried out normally up to the (W−1)th synchronization (step S2202a). Since the synchronization client 50b can receive up to a_W from the synchronization server 10, processing in the synchronization client 50b can proceed normally until the (W+2)th synchronization (step S2201b to step S2206b). The synchronization client 50b cannot receive a_W+1, though, and hence transmits to the synchronization server 10 that, on account of communication state deterioration, processing could be carried out normally up to the (W+2)th synchronization (step S2207a).

As in the above embodiment, the synchronization client 50a notifies the computing unit 60a that the communication state is deteriorated, and the computing unit 60a backs up S_W−1 (same as step S1101a and step S1102a). Thereafter, provisional synchronization processing is carried out using the assumed input information INa_W−1 until ordinary synchronization processing is recommenced (same as step S1103a, step 1104a). For the synchronization client 50b, similarly S_W+2 is backed up and provisional synchronization processing is carried out while using INb_W+2 as the assumed input information (same as step S1101b to step S1104b).

Next follows an explanation of the process carried out upon recovery of the communication state between the synchronization client 50a and the synchronization server 10. The information transmitted in step S2202a reaches the synchronization server 10 (same as step S1201a). Since this time the counts of synchronizations carried out normally in the respective synchronization clients 50 are different (W−1≠W+2), it is checked whether INb_W+2, INb_W+1, INb_W and INb_W−1 are all identical or not (step S1203). If all these are identical, exactly the same input information continues to be delivered to each computing unit, and the synchronization state becomes the same for each synchronization count. As in the above-described embodiment, matching the synchronization count of all the synchronization clients 50 allows equalizing the synchronization states, whereby ordinary synchronization processing can recommence. The process therefrom is identical to the process in the above-described embodiment.

On the other hand, if any one among INb_W+2, INb_W+1, INB_W and INB_W−1 is different from the others, the different input information is delivered to the respective synchronization clients, and no longer can it be ensured that the synchronization state is the same in all the synchronization clients. Thus, as in the above-described embodiment, the synchronization server 10 notifies to each synchronization client 50 that it is necessary to return to the situation in which the synchronization state was backed up (same as step S1401). Therefrom, as in the above described embodiment, the created input information is prepared, and synchronization processing is carried out in accordance with the calculated processing speed, after which ordinary synchronization processing can recommence. Also, as in the above-described embodiment, if V is the count upon recommencement of the synchronization processing, it is preferable to put together beforehand the input information of the V−m, V−m+1, . . . (V−1)th synchronizations in the meantime until synchronization processing recommencement.

Figure 20:
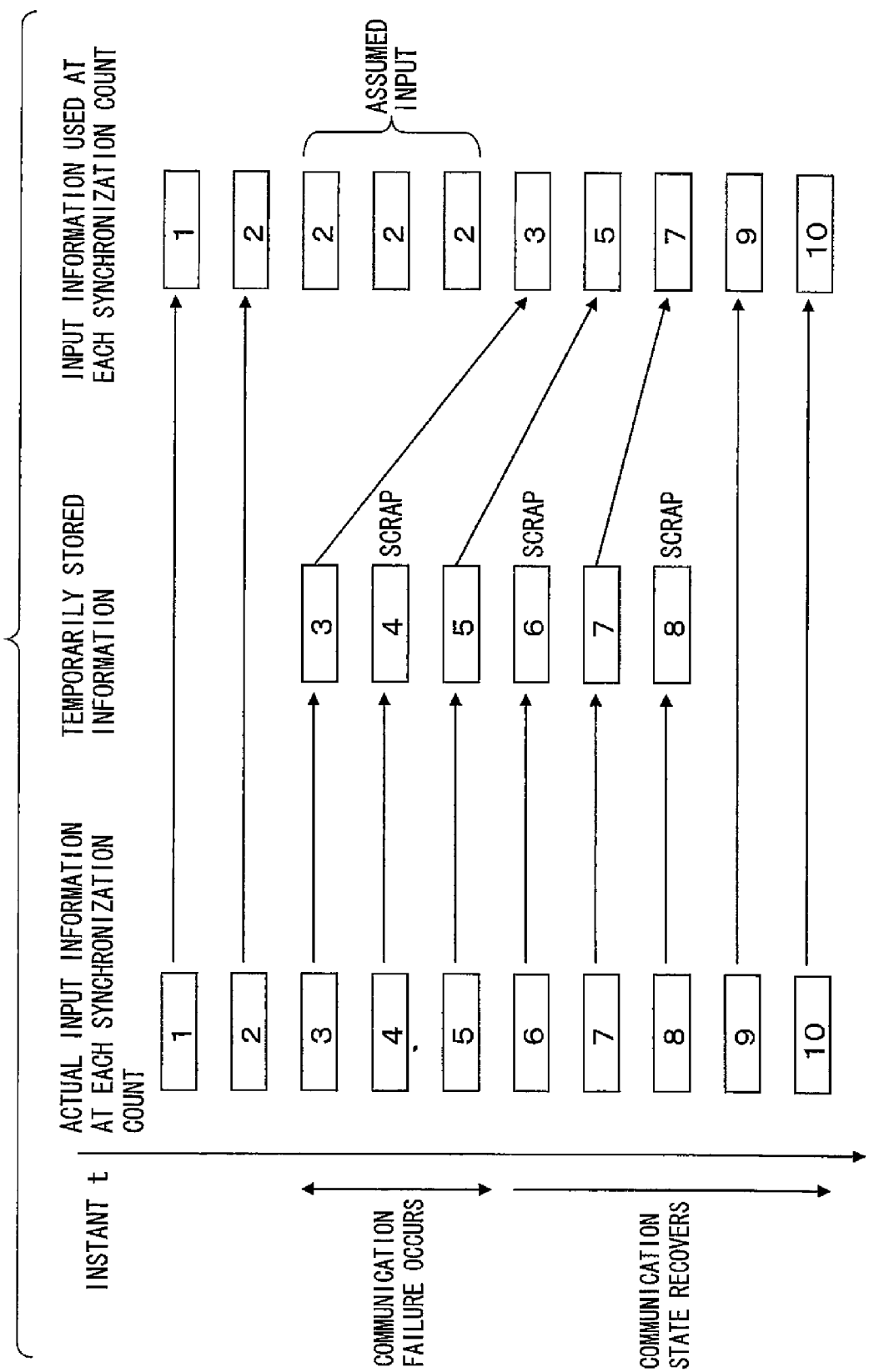
FIG. 20 is a workflow diagram explaining the operation of another embodiment of the synchronous communication game system illustrated in FIG. 1.

In the above-described embodiment are disregarded all actions carried out by the user, such as button operation or the like, from the moment the assumed input information starts being used until recommencement of ordinary synchronization processing. In order to prevent this, the input by the user can be used, without being scrapped, by storing separately actual input information while the assumed input information is being used, and by employing the stored information as input information when ordinary synchronization processing recommences. However, if all the stored information is used, the information inputted by the user will always be used with a delay, thereby constantly annoying the user. In order to prevent this, by using every second piece of stored information by skipping, as illustrated for instance in FIG. 20, the information inputted by the user can be used eventually without delay, so that part of the information inputted by the user can be reflected.

The input information skip is not limited to skipping every second piece of information. The input information may also be used with n skips, wherein n is an integer equal to or larger than 1.

By storing separately actual input information while the assumed input information is being used, and by employing thereafter that stored information with n skips, the above-described constitution allows preventing scrapping of all the information inputted by the user.

Figure 21:
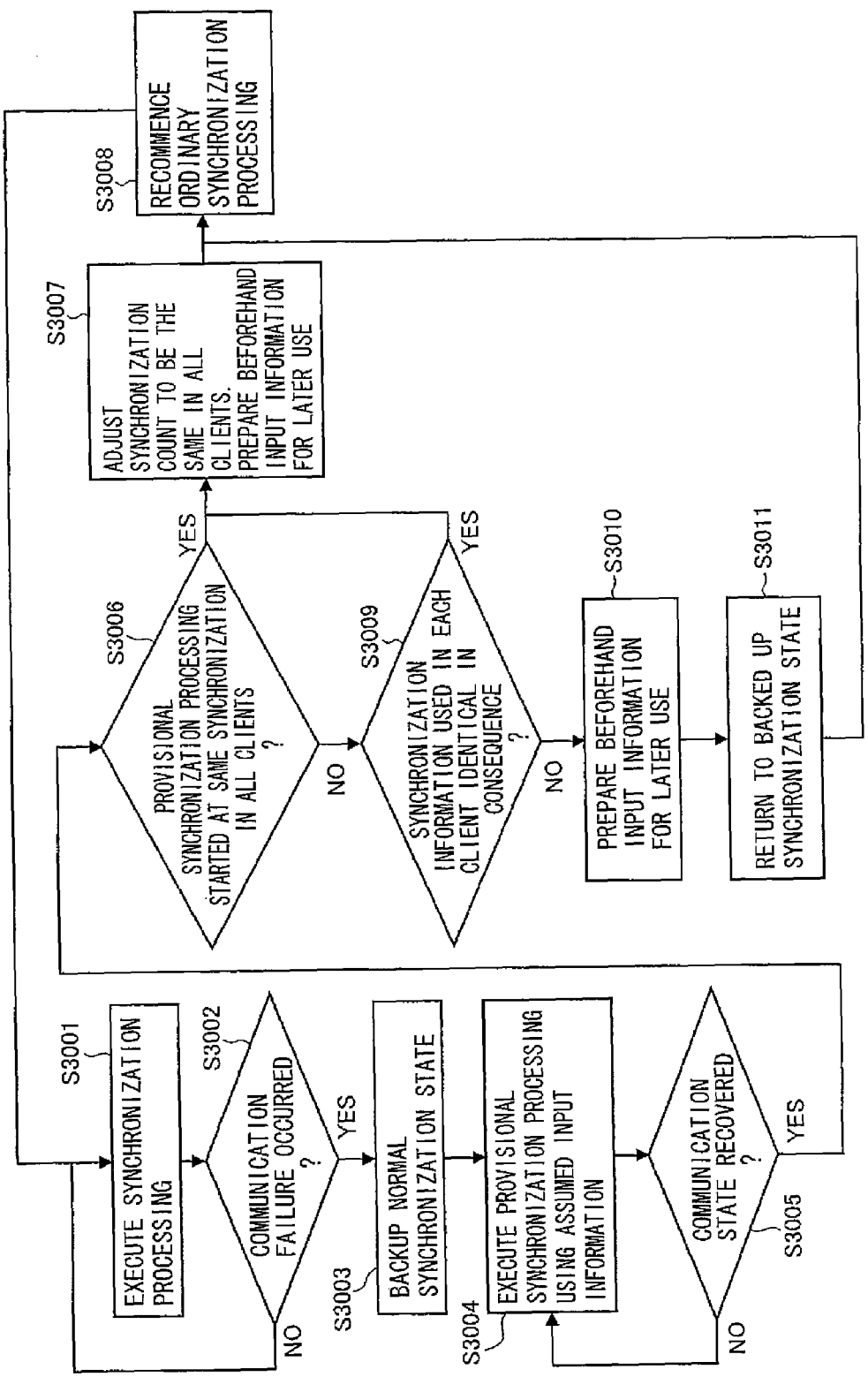
FIG. 21 is a flowchart explaining an overview of the operations illustrated in FIGS. 17 to 20.

An overview of the processes explained thus far is summarized next with reference to FIG. 21. The synchronous communication game system 1 illustrated in FIG. 1 executes synchronization processing (step S3001); upon each synchronization, the system checks whether or not a communication failure has occurred (step S3002); when in step S3002 it is judged that a communication failure has occurred, the current normal synchronization state is backed up (step S3003). On the other hand, when in step S3002 it is judged that no communication failure has occurred, the process returns to step S3001, and synchronization processing is executed.

Following step S3003, provisional synchronization processing is carried out thereafter, using as assumed input information the immediately previous normal input information, until normal synchronization processing is recommenced (step S3004). Next, the system judges whether or not the communication state is recovered (step S3005); when in step S3005 it is judged that the communication state is recovered and recovery could be confirmed, the system judges whether or not provisional synchronization processing has started at the same synchronization in all the clients (step S3006); when in step S3006 it is judged that provisional synchronization processing has started at the same synchronization in all the clients, the synchronization count in all the clients is adjusted so as to become identical, input information to be used thereafter is prepared in advance (step S3007), and ordinary synchronization processing is recommenced (step S3008). On the other hand, when in step S3006 it is judged that provisional synchronization processing has not started at the same synchronization in all the clients, the system judges whether or not the synchronization information (comprising the assumed input information) used in the respective clients was in consequence identical (step S3009); when in step S3009 it is judged that the synchronization input information was identical, the above mentioned process of step S3007 is carried out, and ordinary synchronization processing is recommenced, as indicated in step S3008. On the other hand, when in step S3009 it is judged that the synchronization input information was not identical, the input information to be used thereafter is prepared in advance (step S3010), and the synchronization state of each client is returned to the backed up synchronization state (step S3011) After returning the synchronization state to the backed up synchronization state, ordinary synchronization processing is recommenced, as indicated in step S3008.

The invention claimed is:

1. A synchronous communication device for processing a communication synchronously among a plurality of information terminals connected to a communication line, comprising:

judging means for judging whether or not each of the plurality of information terminals connected to the communication line is in a normal communication state, wherein said normal communication state is a state where all of said plurality of information terminals are in the, synchronization with one another;

input information setting means for setting, as assumed input information, input information inputted before a state during which a synchronization is not possible has occurred, in place of input information inputted in said state, when the judging means judges that an anomaly has occurred in at least one information terminal among the plurality of information terminals so that at least said one information terminal is not synchronized with other information terminal or terminals among said plurality of information terminals, wherein said anomaly is a state where at least one information terminal is not in the synchronization with other information terminal or terminals among said plurality of information terminals; and computing means for determining a synchronization state of a specific matter in the synchronization in which synchronization is not possible, by executing a predetermined computing process on the basis of the assumed input information set by the input information setting means, wherein said judging means repeat each of said processes repeated until the plurality of information terminals shall be in the normal communication state, wherein, if said judging means would judge that said assumed input information is not matched with said actual input information immediately after said recovery to the normal communication state, then said computing means use said actual input information inputted immediately after said recovery to the normal communication state while clearing all information including an outcome of said assumed input information set within said anomaly; and wherein said specific matter is a game, and the computing means executes, as the predetermined computing process, a computing process for obtaining a synchronization state of said game in the synchronization in which synchronization is not possible.

2. The synchronous communication device according to claim 1, wherein the computing means returns the information terminal to a backed-up synchronization state.

3. The synchronous communication device according to claim 1, wherein when the judging means judges that it is not possible to equalize the synchronization state of all the information terminals to the same synchronization state even through continued setting of the input information as assumed input information, the computing means return the information terminal to a backed-up synchronization state.

4. The synchronous communication device according to claim 1, wherein the computing means stores actual input information while the assumed input information is being used, and upon recommencement of ordinary synchronization processing, uses the stored information as input information by skipping said stored information in any arbitrary numbers.

5. The synchronous communication device according to claim 1, wherein the computing process is a combination of one or more among a calculation of the position of a game character, a collision detection, and a score calculation.

6. The synchronous communication device according to claim 1, wherein said computing process is a combination of one or more among a calculation of a position of a game character, a collision detection, and a score calculation.

7. A synchronous communication method for processing communication synchronously among a plurality of information terminals connected to a communication line, comprising:

a step of judging whether or not each of the plurality of information terminals connected to the communication line is in a normal communication state, wherein said normal communication state is a state where all of said plurality of information terminals are in the synchronization with one, another;

a step of setting, as assumed input information, input information inputted before a state during which a synchronization is not possible has occurred, in place of input information inputted in said state, when it is judged that an anomaly has occurred in at least one information terminal among the plurality of information terminals so that at least said one information terminal is not synchronized with other information terminal or terminals among said plurality of information terminals, wherein said anomaly is a state where at least one information terminal is not in the synchronization with other information terminal or terminals among said plurality of information terminals;

a step of determining, on the basis of the set assumed input information, a synchronization state of a specific matter in the synchronization in which synchronization is not possible, by executing a predetermined computing process; and a step of repeating each of said steps until the plurality of information terminals shall be in the normal communication state, wherein, in said judging step, if it would be judged that said assumed input information is not matched with said actual input information immediately after said recovery to the normal communication state, then in said determining step, using said actual input information inputted immediately after said recovery to the normal communication state while clearing all information including an outcome of said assumed input information set within said anomaly, and wherein said specific matter is a game and, in the determining step, as the predetermined computing process, a computing process is executed for obtaining a synchronization state of said game in the synchronization, in which synchronization is not possible.

8. The synchronous communication method according to claim 7, wherein, in the determining step, the information terminal is returned to a backed-up synchronization state.

9. The synchronous communication method according to claim 7, wherein in the determining step, the information terminal is returned to a backed-up synchronization state when it is judged in the judgment step that it is not possible to equalize the synchronization state of all the information terminals to the same synchronization state even through continued setting of the input information as assumed input information.

10. The synchronous communication method according to claim 7, wherein in the determining step, an actual input information is stored while the assumed input information is being used, and upon recommencement of ordinary synchronization processing, the stored information is used as input information by skipping said stored information in any arbitrary numbers.

* * * * *